US009793525B2

(12) United States Patent
Johnson et al.

(10) Patent No.: US 9,793,525 B2
(45) Date of Patent: Oct. 17, 2017

(54) SOLID-STATE BATTERY ELECTRODES

(71) Applicant: Johnson Battery Technologies, Inc., Atlanta, GA (US)

(72) Inventors: Lonnie G. Johnson, Atlanta, GA (US); David K. Johnson, Douglasville, GA (US)

(73) Assignee: Johnson Battery Technologies, Inc., Atlanta, GA (US)

( * ) Notice: Subject to any disclaimer, the term of this patent is extended or adjusted under 35 U.S.C. 154(b) by 56 days.

(21) Appl. No.: 13/829,951

(22) Filed: Mar. 14, 2013

(65) Prior Publication Data
US 2014/0099538 A1 Apr. 10, 2014

Related U.S. Application Data

(60) Provisional application No. 61/711,676, filed on Oct. 9, 2012.

(51) Int. Cl.
*H01M 2/16* (2006.01)
*H01M 10/052* (2010.01)
(Continued)

(52) U.S. Cl.
CPC .......... *H01M 2/1646* (2013.01); *H01M 4/13* (2013.01); *H01M 4/134* (2013.01); *H01M 4/621* (2013.01);
(Continued)

(58) Field of Classification Search
CPC ................. H01M 4/46; H01M 4/466; H01M 2300/0065; H01M 4/13; H01M 4/621; H01M 4/134; H01M 4/131; H01M 4/139; H01M 4/0411; H01M 4/043; H01M 4/1395; H01M 4/405; H01M 2/1646;
(Continued)

(56) References Cited

U.S. PATENT DOCUMENTS 3,237,078 A 2/1966 Mallory
3,393,355 A 7/1968 Whoriskey et al.
(Continued)

FOREIGN PATENT DOCUMENTS

CN 101434417 A 5/2009
DE 102004010892 B3 11/2005
(Continued)

OTHER PUBLICATIONS

"Final Office Action", U.S. Appl. No. 12/198,421, (dated Jan. 7, 2013), 16 pages.
(Continued)

*Primary Examiner* — Jane Rhee
(74) *Attorney, Agent, or Firm* — Panitch Schwarze Belisario & Nadel LLP

(57) ABSTRACT

Embodiments of solid-state batteries, battery components, and related construction methods are described. The components include one or more embodiments of a low melt temperature electrolyte bonded solid-state rechargeable battery electrode and one or more embodiments of a composite separator having a low melt temperature electrolyte component. Embodiments of methods for fabrication of solid-state batteries and battery components are described. These methods include co-extrusion, hot pressing and roll casting.

17 Claims, 7 Drawing Sheets

(51) Int. Cl.
*H01M 10/0562* (2010.01)
*H01M 4/13* (2010.01)
*H01M 4/62* (2006.01)
*H01M 10/04* (2006.01)
*H01M 4/134* (2010.01)
*H01M 4/131* (2010.01)
*H01M 4/139* (2010.01)
*H01M 4/02* (2006.01)
*H01M 4/04* (2006.01)
*H01M 4/1395* (2010.01)
*H01M 4/40* (2006.01)

(52) U.S. Cl.
CPC ..... *H01M 10/0436* (2013.01); *H01M 10/052* (2013.01); *H01M 10/0562* (2013.01); *H01M 2/1673* (2013.01); *H01M 4/043* (2013.01); *H01M 4/0411* (2013.01); *H01M 4/131* (2013.01); *H01M 4/139* (2013.01); *H01M 4/1395* (2013.01); *H01M 4/405* (2013.01); *H01M 2004/027* (2013.01); *H01M 2300/0068* (2013.01); *H01M 2300/0091* (2013.01)

(58) Field of Classification Search
CPC ............. H01M 2/1673; H01M 10/052; H01M 10/0562; H01M 10/436; H01M 2004/027; H01M 2300/0068; H01M 2300/0091
USPC ........................................................ 429/211
See application file for complete search history.

(56) References Cited

U.S. PATENT DOCUMENTS

| | | |
|---|---|---|
| 4,299,682 A | 11/1981 | Oda et al. |
| 4,303,877 A | 12/1981 | Meinhold |
| 4,352,068 A | 9/1982 | Weppner |
| 4,386,020 A | 5/1983 | Hartwig et al. |
| 4,419,421 A | 12/1983 | Wichelhaus et al. |
| 4,495,078 A | 1/1985 | Bell et al. |
| 4,513,069 A | 4/1985 | Kreuer et al. |
| 4,526,855 A | 7/1985 | Hartwig et al. |
| 4,614,905 A | 9/1986 | Petersson et al. |
| 4,654,281 A | 3/1987 | Anderman et al. |
| 4,704,341 A | 11/1987 | Weppner et al. |
| 4,710,848 A | 12/1987 | Schlechtriemen et al. |
| 4,719,401 A | 1/1988 | Altmejd |
| 4,777,119 A | 10/1988 | Brault et al. |
| 4,792,752 A | 12/1988 | Schlechtriemen et al. |
| 4,885,267 A | 12/1989 | Takahara et al. |
| 4,931,214 A | 6/1990 | Worrell et al. |
| 5,023,153 A | 6/1991 | Weppner |
| 5,202,788 A | 4/1993 | Weppner |
| 5,260,821 A | 11/1993 | Chu et al. |
| 5,270,635 A | 12/1993 | Hoffman et al. |
| 5,291,116 A | 3/1994 | Feldstein et al. |
| 5,314,765 A | 5/1994 | Bates |
| 5,322,601 A | 6/1994 | Liu et al. |
| 5,336,573 A | 8/1994 | Zuckerbrod et al. |
| 5,338,625 A | 8/1994 | Bates et al. |
| 5,362,581 A | 11/1994 | Chang et al. |
| 5,387,857 A | 2/1995 | Honda et al. |
| 5,411,592 A | 5/1995 | Ovshinsky et al. |
| 5,445,906 A | 8/1995 | Hobson et al. |
| 5,455,126 A | 10/1995 | Bates et al. |
| 5,474,959 A | 12/1995 | Schafer et al. |
| 5,512,147 A | 4/1996 | Bates et al. |
| 5,522,955 A | 6/1996 | Brodd |
| 5,561,004 A | 10/1996 | Bates et al. |
| 5,567,210 A | 10/1996 | Bates et al. |
| 5,569,520 A | 10/1996 | Bates |
| 5,597,660 A | 1/1997 | Bates et al. |
| 5,612,152 A | 3/1997 | Bates |
| 5,654,084 A | 8/1997 | Egert |
| 5,705,293 A * | 1/1998 | Hobson ........................ 429/162 |
| 5,778,515 A | 7/1998 | Menon |
| 5,783,928 A | 7/1998 | Okamura |
| 5,811,205 A | 9/1998 | Andrieu et al. |
| 5,821,733 A | 10/1998 | Turnbull |
| 6,022,642 A | 2/2000 | Tsukamoto et al. |
| 6,139,986 A | 10/2000 | Kurokawa et al. |
| 6,168,884 B1 | 1/2001 | Neudecker et al. |
| 6,182,340 B1 | 2/2001 | Bishop |
| 6,201,123 B1 | 3/2001 | Daikai et al. |
| 6,242,129 B1 | 6/2001 | Johnson |
| 6,255,122 B1 | 7/2001 | Duncombe et al. |
| 6,387,563 B1 | 5/2002 | Bates |
| 6,413,672 B1 | 7/2002 | Suzuki et al. |
| 6,541,161 B1 | 4/2003 | Scanlon, Jr. |
| 6,679,926 B1 | 1/2004 | Kajiura et al. |
| 6,827,921 B1 | 12/2004 | Singhal et al. |
| 6,852,139 B2 | 2/2005 | Zhang et al. |
| 6,886,240 B2 | 5/2005 | Zhang et al. |
| 6,887,612 B2 | 5/2005 | Bitterlich et al. |
| 7,510,800 B2 | 3/2009 | Yoshida et al. |
| 7,540,886 B2 | 6/2009 | Zhang et al. |
| 7,557,055 B2 | 7/2009 | Zhang et al. |
| 7,732,096 B2 | 6/2010 | Thackeray et al. |
| 7,776,478 B2 * | 8/2010 | Klaassen ........................ 429/300 |
| 7,824,795 B2 | 11/2010 | Yoshida et al. |
| 7,901,658 B2 | 3/2011 | Weppner et al. |
| 7,914,932 B2 | 3/2011 | Yoshida et al. |
| 7,998,622 B2 | 8/2011 | Inda |
| 8,092,941 B2 | 1/2012 | Weppner et al. |
| 8,173,292 B2 | 5/2012 | Kato |
| 8,192,869 B2 | 6/2012 | Teramoto |
| 8,211,496 B2 | 7/2012 | Johnson et al. |
| 8,221,916 B2 | 7/2012 | Inda |
| 8,383,268 B2 | 2/2013 | Inda |
| 8,431,287 B2 | 4/2013 | Teramoto |
| 8,476,174 B2 | 7/2013 | Inda |
| 8,808,407 B2 | 8/2014 | Inda |
| 8,822,077 B2 | 9/2014 | Katoh |
| 8,852,816 B2 | 10/2014 | Ogasa |
| 8,883,355 B2 | 11/2014 | Inda |
| 8,951,681 B2 | 2/2015 | Katoh |
| 9,034,525 B2 | 5/2015 | Babic et al. |
| 9,153,838 B2 | 10/2015 | Ogasa |
| 9,159,989 B2 | 10/2015 | Ogasa |
| 9,266,780 B2 | 2/2016 | Ogasa |
| 9,379,375 B2 | 6/2016 | Sugiura et al. |
| 9,413,033 B2 | 8/2016 | Ogasa |
| 9,425,454 B2 | 8/2016 | Sugiura et al. |
| 2001/0014505 A1 | 8/2001 | Duncombe et al. |
| 2002/0000541 A1 | 1/2002 | Sasaki et al. |
| 2002/0048706 A1 | 4/2002 | Mayes et al. |
| 2002/0119375 A1 | 8/2002 | Zhang |
| 2003/0012996 A1 | 1/2003 | Bitterlich et al. |
| 2003/0030039 A1 | 2/2003 | Sasaki et al. |
| 2003/0118897 A1 | 6/2003 | Mino et al. |
| 2004/0081888 A1 | 4/2004 | Thakeray et al. |
| 2004/0111874 A1 | 6/2004 | Schierle-Arndt et al. |
| 2004/0118700 A1 | 6/2004 | Schierle-Arndt et al. |
| 2004/0191617 A1 | 9/2004 | Visco et al. |
| 2005/0084758 A1 | 4/2005 | Yamamoto et al. |
| 2005/0266150 A1 | 12/2005 | Yong et al. |
| 2006/0046149 A1 | 3/2006 | Yong et al. |
| 2006/0068282 A1 | 3/2006 | Kishi et al. |
| 2006/0165578 A1 | 7/2006 | Sasaki et al. |
| 2006/0246355 A1 | 11/2006 | Min et al. |
| 2006/0287188 A1 | 12/2006 | Borland et al. |
| 2007/0031323 A1 | 2/2007 | Baik et al. |
| 2007/0048617 A1 | 3/2007 | Inda |
| 2007/0087269 A1 | 4/2007 | Inda |
| 2007/0148545 A1 | 6/2007 | Amine et al. |
| 2007/0148553 A1 | 6/2007 | Weppner |
| 2007/0231704 A1 | 10/2007 | Inda |
| 2007/0264579 A1 | 11/2007 | Ota |
| 2008/0220334 A1 | 9/2008 | Inda |
| 2008/0241698 A1 | 10/2008 | Katoh |
| 2008/0268346 A1 | 10/2008 | Inda |
| 2009/0004371 A1 | 1/2009 | Johnson et al. |
| 2009/0068563 A1 | 3/2009 | Kanda et al. |
| 2009/0081554 A1 | 3/2009 | Takada et al. |

(56) References Cited

U.S. PATENT DOCUMENTS

| | | |
|---|---|---|
| 2009/0081555 A1 | 3/2009 | Teramoto |
| 2009/0092903 A1 | 4/2009 | Johnson et al. |
| 2009/0098281 A1 | 4/2009 | Zhang et al. |
| 2009/0194222 A1 | 8/2009 | Teramoto |
| 2009/0197178 A1 | 8/2009 | Inda |
| 2009/0197182 A1 | 8/2009 | Katoh |
| 2009/0214957 A1* | 8/2009 | Okada et al. ............... 429/319 |
| 2009/0274832 A1 | 11/2009 | Inda |
| 2010/0028782 A1 | 2/2010 | Inda |
| 2010/0047696 A1 | 2/2010 | Yoshida et al. |
| 2010/0203383 A1 | 8/2010 | Weppner |
| 2011/0053001 A1 | 3/2011 | Babic et al. |
| 2011/0059369 A1 | 3/2011 | Nan et al. |
| 2011/0076542 A1 | 3/2011 | Farmer |
| 2011/0133136 A1 | 6/2011 | Weppner |
| 2011/0177397 A1 | 7/2011 | Ogasa |
| 2011/0223460 A1 | 9/2011 | Farmer |
| 2011/0223467 A1 | 9/2011 | Shacklette et al. |
| 2011/0223487 A1 | 9/2011 | Johnson et al. |
| 2011/0300451 A1 | 12/2011 | Inda |
| 2011/0318650 A1 | 12/2011 | Zhang et al. |
| 2012/0100433 A1 | 4/2012 | Suyama et al. |
| 2012/0141881 A1* | 6/2012 | Geier ............... H01M 4/362 429/311 |
| 2012/0196189 A1 | 8/2012 | Babic et al. |
| 2012/0237834 A1* | 9/2012 | Ogasa ............... H01M 10/0562 429/320 |
| 2012/0251882 A1 | 10/2012 | Moon et al. |
| 2012/0264021 A1 | 10/2012 | Sugiura et al. |
| 2012/0270115 A1 | 10/2012 | Johnson |
| 2013/0011751 A1 | 1/2013 | Nakada et al. |
| 2013/0011752 A1 | 1/2013 | Tanaami et al. |
| 2013/0017454 A1 | 1/2013 | Sato et al. |
| 2013/0095394 A1 | 4/2013 | Tanaami et al. |
| 2013/0164616 A1 | 6/2013 | Nakada et al. |
| 2013/0230777 A1 | 9/2013 | Babic et al. |
| 2013/0273437 A1 | 10/2013 | Yoshioka et al. |
| 2013/0309551 A1 | 11/2013 | Ogasa |
| 2013/0344416 A1 | 12/2013 | Sakamoto et al. |
| 2014/0008006 A1 | 1/2014 | Lee et al. |
| 2014/0011080 A1 | 1/2014 | Lee et al. |
| 2014/0011095 A1 | 1/2014 | Lee et al. |
| 2014/0023933 A1 | 1/2014 | Chiga et al. |
| 2014/0099556 A1 | 4/2014 | Johnson |
| 2014/0287305 A1 | 9/2014 | Wachsman et al. |
| 2015/0037688 A1 | 2/2015 | Otsuka et al. |
| 2015/0056518 A1 | 2/2015 | Babic et al. |
| 2015/0056520 A1 | 2/2015 | Thokchom et al. |
| 2015/0333307 A1 | 11/2015 | Thokchom et al. |

FOREIGN PATENT DOCUMENTS

| | | |
|---|---|---|
| DE | 102007030604 | 1/2009 |
| DE | 102007030604 A1 | 1/2009 |
| EP | 0033935 | 8/1981 |
| EP | 0070020 | 10/1985 |
| EP | 0177062 | 4/1986 |
| EP | 0226955 | 7/1987 |
| EP | 0227996 | 7/1987 |
| EP | 0249802 | 12/1987 |
| EP | 0232513 | 1/1989 |
| EP | 0243975 | 6/1989 |
| EP | 0190605 | 7/1989 |
| EP | 0408039 | 6/1991 |
| EP | 0470597 | 2/1992 |
| EP | 0693581 | 1/1996 |
| EP | 0693581 | 5/1998 |
| EP | 1237212 | 9/2002 |
| EP | 1271683 | 1/2003 |
| EP | 1431423 | 6/2004 |
| EP | 1431422 | 12/2006 |
| EP | 2037527 | 3/2009 |
| EP | 2086040 A2 | 8/2009 |
| EP | 2685551 | 1/2014 |
| EP | 2706598 A1 | 3/2014 |
| JP | 2000311710 A | 11/2000 |
| JP | 2000331680 A | 11/2000 |
| JP | 2000331684 A | 11/2000 |
| JP | 2001-126757 A | 5/2001 |
| JP | 2001243954 | 9/2001 |
| JP | 2004127613 A | 4/2004 |
| JP | 2006261008 A | 9/2006 |
| JP | 2006-310295 A | 11/2006 |
| JP | 2009176741 | 8/2009 |
| JP | 2010067499 A | 3/2010 |
| JP | 2010-080426 A | 4/2010 |
| JP | 2010080426 | 4/2010 |
| JP | 2010-129190 A | 6/2010 |
| JP | 2011134675 A | 7/2011 |
| JP | 2011150817 A | 8/2011 |
| JP | 2011249254 A | 12/2011 |
| JP | 2012-099315 A | 5/2012 |
| JP | 2012146479 | 8/2012 |
| JP | 2013037992 | 2/2013 |
| JP | 2012099315 | 5/2013 |
| JP | 2013157084 A | 8/2013 |
| JP | 2015138741 A | 7/2015 |
| WO | WO-2005085138 | 9/2005 |
| WO | 2007004590 A1 | 1/2007 |
| WO | 2009003695 A2 | 1/2009 |
| WO | WO-2009029746 | 3/2009 |
| WO | WO-2009003695 | 2/2010 |
| WO | 2011007445 A1 | 1/2011 |
| WO | 20111125481 | 10/2011 |
| WO | 2011156392 A1 | 12/2011 |
| WO | 2012008422 A1 | 1/2012 |
| WO | WO-2012018831 | 2/2012 |
| WO | 2012128374 A1 | 9/2012 |
| WO | WO-2012144553 | 10/2012 |
| WO | WO-2013049460 | 4/2013 |
| WO | WO-2013085557 | 6/2013 |
| WO | WO-2013130983 | 9/2013 |
| WO | WO-2013131005 | 9/2013 |
| WO | 2014/058684 A2 | 4/2014 |
| WO | 2014058683 A1 | 4/2014 |

OTHER PUBLICATIONS

"International Search Report and Written Opinion", PCT Application PCT/US2011/046289, (dated Jan. 6, 2012), 13 pages.

"Non-Final Office Action", U.S. Appl. No. 12/163,044, (dated Jul. 13, 2011), 15 pages.

"Non-Final Office Action", U.S. Appl. No. 12/198,421, (dated Jan. 24, 2012), 11 pages.

"Notice of Allowance", U.S. Appl. No. 12/163,044, (dated Mar. 16, 2012), 8 pages.

"Restriction Requirement", U.S. Appl. No. 12/198,421, (Aug. 30, 2012), 6 pages.

"Restriction Requirement", U.S. Appl. No. 12/198,421, (dated Oct. 11, 2011), 7 pages.

Ahn, Jun-Ku et al., "Characteristics of Amorphous Lithium Lanthanum Titanate Electrolyte Thin Films Grown by PLD for Use in Rechargeable Lithium Microbatteries", *Electrochemical and Solid-State Letters*, vol. 8, No. 2, (May 28, 2004), pp. A75-A78.

Ahn, Jun-Ku et al., "Characteristics of Perovskite ($Li_{0.5}La_{0.5}$)$TiO_3$ Solid Electrolyte Thin Films Grown by Pulsed Laser Deposition for Rechargeable Lithium Microbattery", *Electrochimica Acta*, vol. 50, (Aug. 4, 2004), pp. 371-374.

Ahn, Jun-Ku et al., "Effect of $Li_{0.5}La_{0.5}TiO_3$ Solid Electrolyte Films on Electrochemical Properties of $LiCoO_2$ Thin Film Cathodes with Different Rapid-Thermal Annealing Conditions", *Journal of Vacuum Science & Technology B*; vol. 23, No. 5, (2005), pp. 2089-2094.

Allnatt, A.R. et al., "Atomic Transport in Solids", *Cambridge University Press*, (2003), pp. ix-xiii.

Aruna, Singanahally T., et al., "Combustion Synthesis and Nanomaterials", *Current Opinion in Solid State and Materials Science*; vol. 12, (2008), pp. 44-50.

(56) References Cited

OTHER PUBLICATIONS

Awaka, Junji et al., "Synthesis and Structure Analysis of Tetragonal $Li_7La_3Zr_2O_{12}$ with the Garnet-Related Type Structure", *Journal of Solid State Chemistry*, vol. 182, No. 8, (May 22, 2009), pp. 2046-2052.

Bates, J.B. et al., "Rechargeable Thin-Film Lithium Batteries", *Oak Ridge National Laboratory Publication*, (Aug. 1993), 9 pages.

Billinge, Simon J., "The Nanostructure Problem", *Physics*; vol. 3, No. 25, (2010), pp. 1-3.

Birke, P. et al., "Electrolytic Stability Limit and Rapid Lithium Insertion in the Fast-Ion-Conducting $Li_{0.29}La_{0.57}TiO_3$ Perovskite-Type Compound", *Journal of the Electrochemical Society*; vol. 144, No. 6, (Jun. 1997), pp. L167-L169.

Bohnke, O. et al., "Mechanism of Ionic Conduction and Electrochemical Intercalation of Lithium into the Perovskite Lanthanum Lithium Titanate", *Solid State Ionics*; vol. 91, (1996), pp. 21-31.

Brinker, C. J., et al., "Sol-Gel Science: The Physics and Chemistry of Sol-Gel Processing", *Academic Press*, (1990), pp. 21, 95, 453, 513, 675, 742, 787, and 837.

Cussen, Edmund J., "Structure and Ionic Conductivity in Lithium Garnets", *Journal of Materials Chemistry*; vol. 20, (2010), pp. 5167-5173.

Davison, et al., "Low Cost, Novel Methods for Fabricating All-Solid-State Lithium Ion Batteries", Retrieved from <http://www.wpi.edu/Pubs/E-project/Available/E-project-042312-141301/unrestricted/SS_Lithium_Ion_Battery_MQP Final_Report.pdf>, (Apr. 23, 2012), 126 pages.

Drabold, D.A. "Topics in the Theory of Amorphous Materials", *The European Physical Journal B*; vol. 68, (2009), pp. 1-21.

Elliott, S.R. "Physics of Amorophous Materials", *Longman Scientific & Technical Second Edition*, (1990), pp. v-vi.

Furusawa, Shin-Ichi et al., "Ionic Conductivity of Amorphous Lithium Lanthanum Titanate Thin Film", *Solid Stage Ionics*; vol. 176, (2005), pp. 553-558.

Gao, Y.X. et al., "Sol-Gel Synthesis and Electrical Properties of $Li_5La_3Ta_2O_{12}$ Lithium Ionic Conductors", *Solid State Ionics*; vol. 181, Nos. 1-2, (2009), pp. 33-36.

Geiger, Charles A., et al., "Crystal Chemistry and Stability of "$Li_7La_3Zr_2O_{12}$" Garnet: A Fast Lithium-Ion Conductor", *Inorganic Chemistry*; vol. 50, (2011), pp. 1089-1097.

Glass, A.M. et al., "Ionic Conductivity of Quenched Alkali Niobate and Tantalate Glasses", *Journal of Applied Physics*; vol. 49, No. 9, (1978), pp. 4808-4811.

Goodenough, John B., et al., "Challenges for Rechargeable Li Batteries", *Chemistry of Materials*; vol. 22, No. 3, (2010), pp. 587-603.

Huggins, Robert A., "Advanced Batteries: Materials Science Aspects", *Springer; First Edition*, (2008),pp. xvii-xxx, 368-371.

Inaguma, Yoshiyuki et al., "High Ionic Conductivity in Lithium Lanthanum Titanate", *Solid State Communications*; vol. 86, No. 10, (1993), 5 pages.

Jena, Hrudananda et al., "Studies on the Ionic Transport and Structural Investigations of $La_{0.5}Li_{0.5}TiO_3$ Perovskite Synthesized by Wet Chemical Methods and the Effect of Ce, Zr Substitution at Ti Site", *Journal of Materials Science*; vol. 40, (2005), pp. 4737-4348.

Jin, et al., "All-Solid-State Rechargeable Lithium Ion Battery Fabrication with Al-Doped $Li_7La_3Zr_2O_{12}$ Solid Electrolyte", Retrieved from <http://international.dep.anl.gov/Postdocs/Symposium/Program/Presentations/32.pdf>on Oct. 8, 2012, 1 page.

Kim, Ki Hyun et al., "Characterization of the Interface between $LiCoO_2$ and $Li_7La_3Zr_2O_{12}$ in an All-Solid-State Rechargeable Lithium Battery", *Journal of Power Sources*; vol. 196, (2011), pp. 764-767.

Kishida, K. et al., "Microstructure of the $LiCoO_2$ (Cathode)/$La_{2/3-x}Li_{3x}TiO_3$ (Electrolyte) Interface and its Influences on the Electrochemical Properties", *Acta Materialia*; vol. 55, No. 14, (2007), pp. 4713-4722.

Kitaoka, K. et al., "Preparation of $La_{0.5}Li_{0.5}TiO_3$ Perrovskite Thin Films by the Sol-Gel Method", *Journal of Materials Science*; vol. 32, (1997), pp. 2063-2070.

Kokal, I. et al., "Sol-Gel Synthesis and Lithium Ion Conductivity of $Li_7La_3Zr_2O_{12}$ with Garnet-Related Type Structure", *Solid State Ionics*; vol. 185, (2010), pp. 385-390.

Kotobuki, Masashi et al., "Compatibility of $Li_7La_3Zr_2O_{12}$ Solid Electrolyte to All-Solid-State Battery Using Li Metal Anode", *Journal of the Electrochemical Society*; vol. 157, No. 10, (2010), pp. A1076-A1079.

Kotobuki, Masashi et al., "Fabrication of Three-Dimensional Battery Using Ceramic Electrolyte with Honeycomb Structure by Sol-Gel Process", *Journal of the Electrochemical Society*; vol. 157, No. 4, (2010), pp. A493-A498.

Laughlin, J.B. et al., "Using Sol-Gel Chemistry to Synthesize a Material with Properties Suited for Chemical Sensing", *Journal of Chemical Education*; vol. 77, No. 1, (2000), pp. 77-78.

Lee, Seung-Tae et al., "The Production of LiCoO2 Cathode Thick Films for an All-Solid-State Microbattery", *Journal of Ceramic Processing Research*; vol. 8, No. 2, (2007), pp. 106-109.

Li, Chi-Lin et al., "Physical and Electrochemical Characterization of Amorphous Lithium Lanthanum Titanate Solid Electrolyte Thin-Film Fabricated by E-Beam Evaporation", *Thin Solid Films*; vol. 515, (2006), pp. 1886-1892.

Li, Jingxin et al., "Synthesis and Characterization of Li Ion Conducting $La_{2/3-x}Li_{3x}TiO_3$ by a Polymerizable Complex Method", *Ceramics International*; vol. 33, (2007), pp. 1591-1595.

Machida, N. et al., "All-Solid State Lithium Battery with $LiCo_{0.3}Ni_{0.7}O_2$ Fine Powder as Cathode Materials with an Amorphous Sulfide Electrolyte", *Journal of the Electrochemical Society*; vol. 149, No. 6, (2002), pp. A688-A693.

Maqueda, O. et al., "Structural, Microstructural and Transport Properties Study of Lanthanum Lithium Titanium Perovskite Thin Films Grown by Pulsed Laser Deposition", *Thin Solid Films*; vol. 516, (2008), pp. 1651-1655.

Murugan, Ramaswamy et al., "Fast Lithium Ion Conduction in Garnet-Type $Li_7La_3Zr_2O_{12}$", *Angewandte Chemie International Edition*; vol. 46, (2007), pp. 7778-7781.

Nagata, K. et al., "All Solid Battery with Phosphate Compounds made through Sintering Process", *Journal of Power Sources*; vol. 174, (2007), pp. 832-837.

Nimisha, C.S. et al., "Chemical and Microstructural Modifications in LiPON Thin Films Exposed to Atmospheric Humidity", *Chemical Reviews*; vol. 104, (2011), pp. 47-51.

Oh, Jung-Min et al., "Ionomer Binders Can Improve Discharge Rate Capability in Lithium-Ion Battery Cathodes", *Journal of the Electrochemical Society*; vol. 158, No. 2, (2011), pp. A207-A213.

Ohta, Shingo et al., "All-solid-state lithium ion battery using garnet-type oxide and $Li_3BO_3$ solid electrolytes fabricated by screen-printing", *Journal of Power Sources*, (Feb. 25, 2013), 25 pages.

Owen, John R., "Rechargeable Lithium Batteries", *Chemical Society Reviews*; vol. 26 (1997), pp. 259-267.

Peters, A. et al., "Ionic Conductivity and Activation Energy for Oxygen Ion Transport in Superlattices—The Multilayer System CSZ ($ZrO_2$=CaO)/$Al_2O_3$", *Solid State Ionics*; vol. 178, Nos. 1-2, (2007), pp. 67-76.

Pham, Quoc N., et al., "Synthesis and Characterization of Nanostructured Fast Ionic Conductor $Li_{0.30}La_{0.56}TiO_3$", *Chemistry of Materials*; vol. 18, No. 18, (2006), pp. 4385-4392.

Popovici, Ionela C., et al., "Sol-Gel Preperation and Characterization of Perovskite Lanthanum Lithium Titanate", *Journal of Materials Science*; vol. 42, (2007), pp. 3373-3377.

Ramzy, Adam et al., "Tailor-Made Development of Fast Li Ion Conducting Garnet-Like Solid Electrolytes", *Applied Materials & Interfaces*; vol. 2., No. 2, (2010), pp. 385-390.

Raskovalov, A A., et al., "Structure and transport properties of $Li_7La_3Zr_{2-0.75x}Al_xO_2$ superionic solid electrolytes", *Journal of Power Sources*, (Mar. 12, 2013), 25 pages.

Sanchez, C. et al., "Chemical Modification of Alkoxide Precursors", *Journal of Non-Crystalline Solids*; vol. 100, (1988), pp. 65-76.

(56) References Cited

OTHER PUBLICATIONS

Song, J.Y. et al., "Review of Gel-Type Polymer Electrolytes for Lithium-Ion Batteries", *Journal of Power Sources*; vol. 77, (1999), pp. 183-197.
Stramare, S. et al., "Lithium Lanthanum Titanates: A Review", *Chemistry of Materials*; vol. 15, (2003), pp. 3974-3990.
Sun, Li et al., "High-Strength All-Solid Lithium Ion Electrodes based on $Li_4Ti_5O_{12}$", *Journal of Power Sources*; vol. 174, (2007), pp. 832-837.
Vijayakumar, Murugesan et al., "Synthesis of Fine Powders of $Li_{3x}La_{2/3-x}TiO_3$ Perovskite by a Polymerizable Precursor Method", *Chemistry of Materials*; vol. 16, No. 14, (2004), pp. 2719-2724.
West, Anthony R., "Basic Solid State Chemistry", *John Wiley & Sons Ltd.*; Second Edition (1999), pp. vii-xv, 346-351.
Xiong, Yuli et al., "Effects of Annealing Temperature on Structure and Opt-Electric Properties of Ion-Conducting LLTO Thin Films Prepared by RF Magnetron Sputtering", *Journal of Alloys and Compounds*; vol. 509, (2011), pp. 1910-1914.
Xu, Kang "Nonaqueous Liquid Electrolytes for Lithium-Based Rechargeable Batteries", *Chemical Reviews*; vol. 104, (2004), pp. 4303-4417.
Yang, Kai-Yun et al., "Ionic to Mixed Ionic/Electronic Conduction Transition of Chemically Lithiated $Li_{0.33}La_{0.56}TiO_3$ at Room Temperature: Lithium-Ion-Motion Dependent Electron Hopping", *Applied Physics Letters*; vol. 89 (2006),3 pages.
Zallen, Richard "The Physics of Amorphous Solids", *Wiley-VCH*; First Edition, (1983), pp. ix-xi.
Zhang, De-Qing et al., "Study on Synthesis and Evolution of Sodium Potassium Niobate Ceramic Powders by an Oxalic Acid-Based Sol-Gel Method", *Journal of Sol-Gel Science and Technology*; vol. 57, (2011), pp. 31-35.
"Non-Final Office Action", U.S. Appl. No. 12/848,991, dated Dec. 6, 2013, 10 pages.
"Restriction Requirement", U.S. Appl. No. 13/410,895, dated Dec. 11, 2013, 6 pages.
"Non-Final Office Action", U.S. Appl. No. 12/848,991, (dated Dec. 6, 2013),10 pages.
"Restriction Requirement", U.S. Appl. No. 12/848,991, (dated Sep. 9, 2013), 6 pages.
"Restriction Requirement", U.S. Appl. No. 13/410,895, (dated Dec. 11, 2013), 6 pages.
Kobayashi, et al.,' "All-solid-state lithium secondary battery with ceramic/polymer composite electrolyte", National Institute of Advanced Industrial Science and Technology, Green Life Technology Research Complex, Mar. 15, 2002, 6 pages.
Kotobuki, et al.,' "Fabrication of All-Solid-State lithium battery using novel garnet type electrolyte", a Department of Applied Chemistry, Graduate School of Urban Environmental Science, Tokyo Metropolitan University—Retrieved on Nov. 17, 2014, 1 page.
Mateishina, et al.,' "Solid-State Electrochemical Lithium Cells with Oxide Electrodes and Composite Solid Electrolyte", Institute of Solid-State Chemistry and Mechanochemistry, Siberian Division, Russian Academy of Sciences, ul. Kutateladze 18, Novosibirsk, 630128 Russia, Jul. 12, 2006, 3 pages.
Munshi, "Handbook of Solid State Batteries & Capacitors", Chapters 10 & 11, 1995, 38 pages.
"Written Opinion", Application No. PCT/US2013/063161, dated Sep. 22, 2014, 9 Pages.
"Final Office Action", U.S. Appl. No. 12/848,991, dated Apr. 29, 2014, 15 pages.
"International Search Report and Written Opinion", Application No. PCT/US2013/063161, dated Apr. 23, 2014, 21 pages.
"International Search Report and Written Opinion", Application No. PCT/US2013/063160, dated Mar. 25, 2014, 22 pages.
"Non-Final Office Action", U.S. Appl. No. 13/410,895, dated May 1, 2014, 9 pages.
"Thin Film Growth by Pulsed Laser Deposition", Ceramics International 22 (1996), 429-434, 1996, 6 pages.
Brenier, "Stress and Moisture-Sorption in Ozone-Annealed Films of Zirconium Oxide Obtained from Sol-Gel", Journal of Sol-Gel Science and Technology, vol. 25, Issue 1, 57-63, Aug. 2002, Aug. 2002, 7 pages.
Kreiter, et al.,' "Sol-gel Routes for Microporous Zirconia and Titania Membranes", Journal of Sol-Gel Science and Technology, Nov. 2008, vol. 48, Issue 1-2, pp. 203-211, Nov. 2008, 9 pages.
Tan, et al.,' "Fabrication and Characterization of $Li_7La_3Zr_2O_{12}$ Thin Films for Lithium Ion Battery", ECS Solid State Letters, 1 (6), Q57-Q60 (2012), 2012, 4 pages.
Thangadurai, et al.,' "Investigations on Electrical Conductivity and Chemical Compatibility between Fast Lithium Ion Conducting Garnet-Like $Li_6BaLa_2Ta_2O_{12}$ and Lithium Battery Cathodes", Journal of Power Sources 142 (2005), 339-344, 2005, 6 pages.
"Lithium Batteries", The Sakamoto Group, 2011, 4 pages.
"Restriction Requirement", U.S. Appl. No. 12/198,421, Oct. 24, 2014, 6 pages.
Aaltonen, et al.,' "Lithium Lanthanum Titanate Thin Films Grown by Atomic Layer Deposition for All-Solid-State Lithium Ion Battery Applications", Abstract 688, the 15th International Meeting on Lithium Batteries—IMLB 2010, 2010 the Electrochemical Society, 2010, 1 page.
Allen, et al.,' "Effect of substitution (Ta, Al, Ga) on the conductivity of $Li_7La_3Zr_2O_{12}$", Journal of Power Sources 206 (2012) 315-319, 2012, 5 pages.
Babic "A Novel, Lithium Conducting,Solid State Electrolyte by Sol Gel Technique", Abstract Only, 2008, 1 page.
Balkanski, et al.,' "Integrable lithium solid-state microbatteries", Journal of Power Sources, vol. 26, Issue 3—Abstract Only, 1989, 1 page.
Birke, et al., ' "A first approach to a monolithic all solid state inorganic lithium battery", Solid State Ionics—vol. 118, Issues 1-2, Abstract Only, 1999, 1 page.
Buschmann, et al.,' "Structure and dynamics of the fast lithium ion conductor $Li_7La_3Zr_2O_{12}$", Physical Chemistry Chemical Physics Issue 43, 2011—Abstract Only, 2011, 1 page.
Cao, et al.,' "Microstructure and Ionic Conductivity of Sb-doped $Li_7La_3Zr_2O_{12}$ Ceramics", Feb. 2014, pp. 221-224.
Chabal, et al.,' "Safer High-performance Electrodes, Solid Electrolytes, and Interface Reactions for Lithium-Ion Batteries", Materials for Energy Storage and Efficiency vol. 8, No. 4, 2013, pp. 104-109.
Chen, et al.,' "Improving ionic conductivity of $Li_{035}La_{055}TiO_3$ ceramics by introducing $Li_7La_3Zr_2O_{12}$ sol into the precursor powder", Solid State Ionics—vol. 235, Mar. 21, 2013, pp. 8-13, Mar. 2013, 6 pages.
Jiajia, et al.,' "Garnet-type $Li_7La_3Zr_2O_{12}$ Electrolyte Prepared by a Solution-Based Technique for Lithium ion battery", Mater. Res. Soc. Symp. Proc. vol. 1440 2012 Materials Research Society, 2012, 6 pages.
Jiajia, et al.,' "Synthesis of Cubic Phase $Li_7La_3Zr_2O_{12}$ Electrolyte for Solid-State Lithium-Ion Batteries", Abstract Only, 2012, 1 page.
Jin, "Processing and Characterization of Secondary Solid-State Li-ion Batteries", Apr. 2013, 128 pages.
Jin, et al.,' "Al-doped $Li_7La_3Zr_2O_{12}$ synthesized by a polymerized complex method", Journal of Power Sources—vol. 196, Issue 20, Oct. 15, 2011, pp. 8683-8687, 2011, pp. 8683-8687.
Jin, et al.,' "Bulk solid state rechargeable lithium ion battery fabrication with Al-doped $Li_7La_3Zr_2O_{12}$ electrolyte and $Cu_{0.1}V_2O_5$ cathode", Electrochimica Acta vol. 89, Feb. 1, 2013, pp. 407-412, 2013, pp. 407-421.
Kitaoka, et al.,' "Preparation of $La_{0.5}Li_{0.5}TiO_3$ perovskite thin films by the sol-gel method", Journal of Materials Science Apr. 1997, vol. 32, Issue 8, pp. 2063-2070, 1997, pp. 2063-2070.
Liu, et al.,' "Enhanced high temperature performance of $LiMn_2O_4$ coated with $Li_3BO_3$ solid electrolyte", Bull. Mater. Sci., vol. 36, No. 4, Aug. 2013, pp. 687-691—Indian Academy of Sciences., Aug. 2013, pp. 687-691.
Mei, et al.,' "Role of amorphous boundary layer in enhancing ionic conductivity of lithium-lanthanum-titanate electrolyte", Electrochimica Acta vol. 55, Issue 8, Mar. 1, 2010, pp. 2958-2963, 2010, pp. 2958-2963.
Roswell et al.,' "A new class of materials for lithium-ion batteries: iron(III) borates", Journal of Power Sources, 2001, pp. 254-257.

(56) References Cited

OTHER PUBLICATIONS

Salaiman, "Fabrication and Characterization of LiNO3-Al2O3 Composite Solid Electrolytes", International Proceedings of Chemical, Biological & Environment—Abstract Only, 2012, 1 page.
Tadanaga, "Low temperature synthesis of highly ion conductive Li7La3Zr2O120-Li3BO3 composites", Electrochemistry Communications 33 (2013) 51-54, 2013, 4 pages.
Tan, "Materials for Energy Storage in Lithium-Ion Batteries", A dissertation submitted to the faculty of the University of Utah in partial fulfillment of the requirements for the degree of, Dec. 2012, 136 pages.
Wolfenstine, "Grain Boundary Conductivity in Crystalline LiTi2(PO4)3", Sensors and Electron Devices Directorate, ARL, Apr. 2008, 14 pages.
Wu, et al.,' "Sol-gel preparation and characterization of Li13Al03Ti17(PO4)3 sintered with flux of LiBO2", Journal Article Rare Metals 29(5) 515-518 (2010), 2010, 4 pages.
Yu et al.,' "A Stable Thin-Film Lithium Electrolyte: Lithium Phosphorus Oxynitride", Journal of the Electrochemical Society, vol. 144, No. 2.—Abstract Only, 1997, 1 page.
Zhang, et al.,' "Effect of lithium borate addition on the physical and electrochemical properties of the lithium ion conductor Li34Si04P06O4", Solid State Ionics 231 (2013) 109-115, 2013, 7 pages.
"Notice of Allowance", U.S. Appl. No. 12/848,991, dated Feb. 19, 2015, 12 pages.
"Non-Final Office Action", U.S. Appl. No. 12/198,421, dated Jan. 2, 2015, 19 pages.
Boyle, et al.,' "All-Ceramic Thin Film Battery", Sandia Report SAND2002-3615 Unlimited Release, Sandia National Laboratories, Nov. 2002, 53 pages.
Scanlon, "AFRL-PR-WP-TM-2003-2135 Lithium Polymer Battery", Final Report for Dec. 8, 1994-Dec. 30, 2002, Energy Storage and Thermal Sciences Branch (AFRL/PRPS), Power Division, Propulsion Directorate, Air Force Research Laboratory, Air Force Materiel Command, Wright-Patterson Air Force Base, OH 45433-7251, Nov. 2003, 22 pages.
"Non-Final Office Action", U.S. Appl. No. 13/829,525, dated Apr. 9, 2015, 19 pages.
"Final Office Action", U.S. Appl. No. 13/829,525, dated Jul. 1, 2015, 20 pages.
"Final Office Action", U.S. Appl. No. 12/198,421, dated Sep. 8, 2015, 27 pages.
"Foreign Office Action", EP Application No. 13776685.3, dated Sep. 4, 2015, 5 Pages.
"Non-Final Office Action", U.S. Appl. No. 14/530,171, dated Jun. 26, 2015, 11 pages.
Jinlian et al, "Enhanced high temperature performance of LiMn2O4 coated with Li3BO3 solid electrolyte," Bull. Mater. Sci., vol. 36, No. 4, pp. 687-691 (2013).
Sakamoto, "Lithium Batteries," Michigan State University (2011).
Office Action dated Feb. 10, 2016 in U.S. Appl. No. 13/829,525 by Johnson.
Int'l Preliminary Report on Patentability dated Dec. 22, 2014 in Int'l Application No. PCT/US2013/063161.
Int'l Preliminary Report on Patentabililty dated Apr. 23, 2015 in Int'l Application No. PCT/US2013/063160.
Int'l Search Report and Written Opinion dated Aug. 22, 2013 in Int'l Application No. PCT/US2013/028633.
Int'l Preliminary Report on Patentability dated Sep. 12, 2014 in Int'l Application No. PCT/US2013/028633.
Meda et al, "Lipon Thin Films Grown by Plasma-Enhanced Metalorganic Chemical Vapor Deposition in a N2-H2-Ar Gas Mixture," Thin Solid Films, vol. 520, pp. 1799-1803 (2012).
Hämäläinen et al, "Lithium Phosphate Thin Films Grown by Atomic Layer Deposition," Journal of the Electrochemical Society, vol. 159, No. 3, pp. A259-A263 (2012).
Office Action dated May 4, 2016 in KR Application No. 10-2014-7027734.

Int'l Preliminary Report on Patentability dated Feb. 14, 2013 in Int'l Application No. PCT/US2011/046289.
Chi-Lin Li et al, "Physical and electrochemical characterization of amorphous lithium lanthanum titanate solid electrolyte thin-film fabricated by e-beam evaporation," Thin Solid Films, vol. 515, pp. 1886-1892 (2006).
Int'l Search Report and Written Opinion dated Aug. 15, 2013 in Int'l Application No. PCT/US2013/028672.
Int'l Preliminary Report on Patentability dated Sep. 2, 2014 in Int'l Application No. PCT/US2013/028672.
Office Action dated Aug. 31, 2015 in KR Application No. 10-2014-7027734.
Office Action dated Sep. 7, 2015 in JP Application No. 2014-560097, translation only.
Office Action dated Mar. 2, 2016 in CN Application No. 201380023413.5.
"Foreign Office Action", EP Application No. 13776685.3, dated Jan. 22, 2016, 4 Pages.
Office Action dated Sep. 14, 2016 in U.S. Appl. No. 12/198,421, by Johnson.
Examination Report dated Jun. 22, 2016 in EP Application No. 13776685.3.
Office Action dated Jul. 27, 2016 in U.S. Appl. No. 13/829,525, by Johnson.
Office Action dated Aug. 22, 2016 in JP Application No. 2014-560097.
Office Action dated Jul. 5, 2016 in CN Application No. 201380052635.X.
Office Action dated Jun. 2, 2016 in CN Application No. 201380052598.2.
Office Action dated Jul. 15, 2016 in KR Application No. 10-2014-7027734.
Examination Report dated Nov. 30, 2016 in EP Application No. 13776685.3.
Chen et al., High Capacity and Cyclic Performance in a Three-Dimensional Composite Electrode Filled with Inorganic Solid Electrolyte. Journal of Power Sources, vol. 249, pp. 306-310 (2014).
Office Action dated Jan. 18, 2017 in U.S. Appl. No. 13/829,525, by Johnson.
Office Action dated Nov. 18, 2016 in CN Application No. 201380023413.5.
Office Action dated Feb. 20, 2017 in JP Application No. 2014-560097.
Office Action dated Jan. 17, 2017 in CN Application No. 201380052635.
Extended European Search Report dated Feb. 8, 2017 in EP Application 16202541.
Extended European Search Report dated Mar. 16, 2017 in EP Application No. 17150717.
Int'l Search Report dated Feb. 17, 2017 in Int'l Application No. PCT/US2016/068105 (Partial).
Okumura et al., "All-Solid-State Lithium-Ion Battery Using Li2.2C0.8B0.8B0.2O3 Electrolyte", Solid State Ionic, vol. 288, pp. 248-252 (2016).
"All-Solid-State Lithium-Ion Battery Using Li2.2C0.8B0.2O3 Electrolyte" External Program 20th Century International Conferencer, Presented on Poster Board, 2 pgs (Jun. 15, 2015).
Shannon et al., "New Li Solid Electrolytes", Electro, vol. 22, No. 7, pp. 783-796 (Jul. 1977).
Office Action dated Feb. 15, 2017 in CN Application No. 201380052598.2.
Int'l Search Report dated Apr. 12, 2017 in Int'l Application No. PCT/US2016/068105 (Complete).
Office Action dated May 19, 2017 in U.S. Appl. No. 12/198,421, by Johnson.
Office Action dated Jun. 15, 2017 in U.S. Appl. No. 14/382,191, by Thokchom.
Office Action dated Jun. 12, 2017 in U.S. Appl. No. 14/382,194, by Thokchom.
Office Action dated Jun. 13, 2017 in JP Application No. 2015-535773.
Office Action issued May 30, 2017 in JP Application No. 2015-535772.

(56) References Cited

OTHER PUBLICATIONS

Office Action issued Aug. 7, 2017 in U.S. Appl. No. 13/829,525, by Johnson.
Office Action dated Aug. 11, 2017 in CN Application No. 2013800234135 (Partial Translation).
Office Action dated Jul. 20, 2017 in CN Application No. 201380052635.

* cited by examiner

SOLID-STATE BATTERY ELECTRODES

RELATED APPLICATIONS

This application claims priority under 35 U.S.C. 119(e) to U.S. Provisional Application No. 61/711,676, filed Oct. 9, 2012, entitled "Solid-State Batteries," the content of which is hereby incorporated by reference.

BACKGROUND

Solid-state Lithium batteries were developed by Duracell in the 1970's and made commercially available in the 1980's but are no longer produced. The cells used a lithium metal anode, a dispersed phase electrolyte of lithium iodide and $Al_2O_3$ and a metal salt as the cathode. The $Li/LiI(Al_2O_3)$/metal salt construction was a true solid-state battery. These batteries were not rechargeable.

It has long been a goal to develop a rechargeable solid state lithium-based battery using inorganic solid electrolyte material because of the passivation reactions and unstable interfaces that form between organic electrolyte materials such as liquid and solid polymer electrolytes. In the early 1990's another all-solid-state battery was developed at the Oak Ridge National Laboratories. These cells consist of thin films of cathode, inorganic electrolyte, and anode materials deposited on a ceramic substrate using vacuum deposition techniques including RF sputtering for the cathode and electrolyte, and vacuum evaporation of the Li metal anode. The total thickness of the cell is typically less than 10um with the cathode being less than 4um, the solid electrolyte around 2um (just sufficient to provide electrical isolation of the cathode and anode) and the Li anode also around 2um. Since strong chemical bonding (both within each layer and between the layers of the cell) is provided by the physical vapor deposition technique, the transport properties are excellent. Although the solid electrolyte LiPON has a conductivity of only $2 \times 10^{-6}$ S/cm-1 (fifty times lower than that of the $LiI(Al_2O_3)$ solid electrolyte used in the Duracell battery described above), the impedance of the thin 2um layer is very small allowing for very high rate capability. Batteries based on this technology are very expensive to fabricate, are very small, and have very low capacity.

Currently, Li-ion battery chemistry gives the highest performance and is becoming the most widely used of all battery chemistries. The cells consist of thick (~100um) porous composite cathodes cast on a thin (~10um) Al foil current collector. The composite cathode typically contains $LiCoO_2$ as the active material due to its high capacity and good cycle life, and carbon black to provide electrical conductivity throughout the layer. A thin polymer separator is used to provide electrical isolation between the cathode and the carbon based anode which intercalates Li during the charge cycle. The cell is immersed in liquid electrolyte which provides very high conductivity for the transport of Li ions between the cathode and anode during charge and discharge. Because the thick composite cathode is porous, the liquid electrolyte is absorbed into and fills the structure, and thus provides excellent surface contact with the LiCoO2 active material to allow fast transport of Li ions throughout the cell with minimal impedance.

The liquid electrolyte itself consists of a Li salt (for example, $LiPF_6$) in a solvent blend including ethylene carbonate and other linear carbonates such as dimethyl carbonate. Despite improvements in energy density and cycle life, there remains an underlying problem with batteries that contain liquid electrolytes. Liquid electrolytes are generally volatile and subject to pressure build up explosion and fire under a high charge rate, a high discharge rate, and/or internal short circuit conditions. Charging at a high rate can cause dendritic lithium growth on the surface of the anode. The resulting dendrites can extend through the separator and cause a short circuit in the cell. The self-discharge and efficiency of the cell is limited by side reactions and corrosion of the cathode by the liquid electrolyte. The liquid electrolyte also creates a hazard if the cell over-heats due to overvoltage or short circuit conditions creating another potential fire or explosion hazard.

To address safety and reliability problems with lithium based batteries that employ liquid electrolytes, and to achieve high energy density, solid-state batteries that employ high capacity lithium intercalation compounds are being developed. These all-solid-state batteries consist of a composite cathode containing active battery cathode material (e.g., $LiNiMnCoO_2$, $LiCoO_2$, $LiMn_2O_4$ $Li_4Ti_5O_{12}$ or similar), an electrically conductive material (e.g., carbon black), and lithium ion conductive glass electrolyte material, such as $Li_{3x}La_{2/3-x}TiO_3$ (x=0.11) (LLTO) or $Li_7La_3Zr_2O_{12}$ (LLZO) that is formed in situ from a liquid precursor via a low temperature sol gel process. When gelled and subsequently cured, the precursor is transformed into a solid lithium ion conductive glass electrolyte. Past attempts at constructing such all-solid-state batteries have been limited by the need to bind the materials together in order to facilitate effective lithium ion transport across interfaces. This binding process has been attempted by sintering at high temperature. The temperatures required for effective sintering are in the range of 600° C. and higher. The problem has been that the cathode and electrolyte materials will react with each other at such sintering temperatures resulting in high impedance interfaces and an ineffective battery.

In constructing a solid-state battery using the low temperature sol gel approach, a cathode is formed by mixing a lithium active material, an electrically conductive material, and the liquid sol gel precursor to form a slurry or paste. The cathode can be formed as either a thick pellet or as a thin casting containing the mixture of cathode components. The cathode is held together by the ion conductive glass electrolyte matrix that is formed by gelling and curing the sol-gel precursor solution. Curing temperature for the gelled precursor is in the range of 300° C., thus parasitic reactions are avoided.

Construction of battery electrodes using the sol gel approach to produce glass electrolyte as a binder requires proper gelling, drying, and curing of the precursor. Gelling of precursors for LLTO and LLZO is a hygroscopic process. Moisture must diffuse into the cathode structure through the tortuous path formed by the densely packed cathode powder materials in order for the cathode material to gel properly throughout. Secondly, drying of the precursor after gelling can be time consuming because solvents and alcohols must diffuse through the gelled electrolyte within the tortuous compacted electrode powder structure.

The all-solid-state primary cell developed by Duracell and described in detail above demonstrated very high energy densities of up to 1000 Wh/L and excellent performance in terms of safety, stability, and low self-discharge. However, due to the pressed powder construction and the requirement for a thick electrolyte separation layer, the cell impedance was very high, severely limiting the discharge rate of the battery. This type of cell is also restricted in application because the electrochemical window is limited to less than three volts due to the iodide ions in the electrolyte which are oxidized above approximately three volts. In addition, a stable rechargeable version of this cell was never developed.

The all-solid-state thin film battery developed by Oak Ridge National Laboratories, also detailed above, addresses many of the problems associated with Li-ion technology, but also has limitations of its own. The vacuum deposition equipment required to fabricate the cells is very expensive and the deposition rates are slow leading to very high manufacturing costs. Also, in order to take advantage of the high energy density and power density afforded by use of the thin films, it is necessary to deposit the films on a substrate that is much smaller and lighter than the battery layers themselves so that the battery layers make up a significant portion of the volume and weight of the battery compared to the inert substrate and packaging components. It is not practical to simply deposit thicker layers as the cathode thickness is limited because lithium diffusion rates within the active material limit the thickness of a cathode that can be charged and discharged at useful rates. Therefore the films must be deposited on very thin substrates (<10um) or multiple batteries must be built up on a single substrate, which leads to problems with maintaining low interface impedance with the electrolyte during the required high temperature annealing of the cathode material after deposition.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Implementations of electrodes for rechargeable solid-state batteries are described. In at least some embodiments, electrodes are fabricated from electrochemically active powder material and meltable inorganic solid electrolyte. The meltable inorganic solid electrolyte is configured to bond together the electrochemically active powder material to form the electrode.

Implementations of rechargeable solid-state batteries are described. In at least some embodiments, batteries are fabricated from a metal foil anode substrate and a separator, which is roll cast on the metal foil anode substrate to form an anode-separator casting.

Implementations of anodes for rechargeable solid-state batteries are described. In at least some embodiments, anodes are fabricated from lithium active powder material and meltable inorganic solid electrolyte. The meltable inorganic solid electrolyte is configured to form a protective coating on individual particles of the lithium active powder material.

BRIEF DESCRIPTION OF THE DRAWINGS

Embodiments of Solid-State Battery Electrodes are described with reference to the following Figures. The same numbers may be used throughout to reference like features and components that are shown in the Figures.

DETAILED DESCRIPTION

Figure 1:
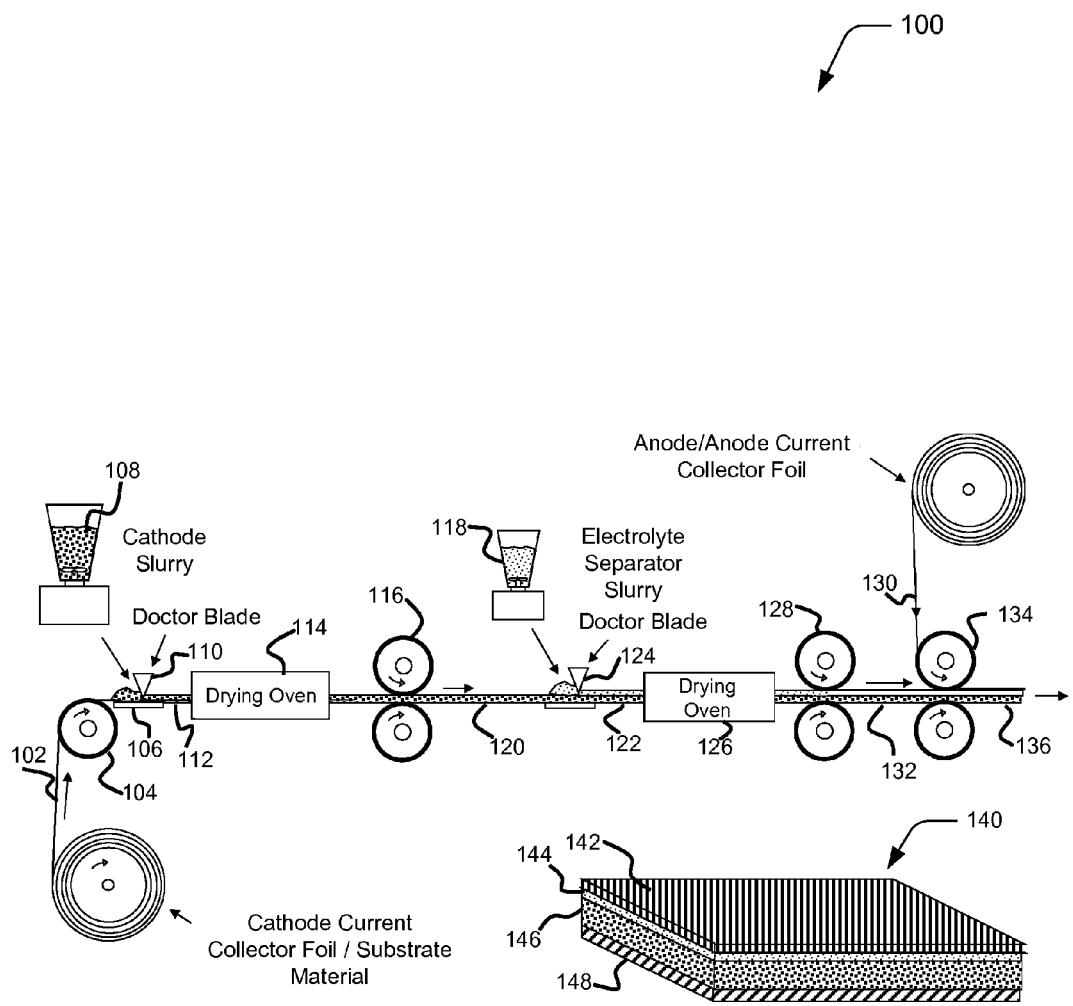
FIG. 1 illustrates an example process for constructing a solid-state battery having a final cell structure representative of a low-melt temperature electrolyte bonded solid-state rechargeable battery electrode.

Implementations of solid-state batteries relate to the construction of various all-solid-state batteries, to include: one or more embodiments of a low melt temperature electrolyte bonded solid-state rechargeable battery electrode; one or more embodiments of a composite separator having a low melt temperature electrolyte component; one or more embodiments of solid-state battery electrodes, separator co-extrusion and roll casting; and/or one or more embodiments of composite low melt temperature electrolyte coated lithium and lithium alloy anodes. Solid-state batteries are the focus of a great deal of attention because of the potential for attractive performance properties including: (1) long shelf life, (2) long term stable power capability, (3) no gassing, (4) broad operating temperature range: 40° C. to 170° C. for pure lithium anodes and up to and beyond 300° C. using active composite anodes, and (5) high volumetric energy density, up to 2000 Wh/L. They are particularly suited for applications requiring long life under low-drain or open-circuit conditions.

In embodiments, a solid-state battery with improved manufacturability over existing solid-state batteries, as well as improved performance and safety over existing Li-ion technology can be constructed using simple manufacturing techniques, such as doctor blade casting and roll rolling. Also, other simple and fast techniques, such as low temperature compression using processes that include hot pressing or rolling, can be utilized in the fabrication of a solid-state battery. Further, a solid-state battery can be fabricated at low cost using ceramic processing techniques such as casting and hot roll annealing. An all-solid-state cell can be constructed that has low impedance, utilizes thick active electrodes relative to the thickness of the inert components, can be fabricated on a large scale, and is safe for applications such as powering cell phones, computers, any other type of electronic device, and even electric vehicles. The solid-state rechargeable batteries have long term stability and reliability, and are suitable for use as a permanent component in such devices.

In embodiments, a solid-state battery has constituent components that are bonded together by an inorganic glass electrolyte produced in situ by a low melt temperature reaction that bonds the constituent materials together to enable ion conduction continuity. The low temperature bonding or sintering of constituent materials of the battery avoids the problems associated with high temperature sintering such as atomic diffusion and migration that can lead to high interface impedances between lithium active materials and lithium electrolyte materials. It is desirable in one or more implementations to have sintering occur below 600° C. A battery electrode can be constructed with powders of a lithium active material, such as lithium titanium oxide, lithium cobalt oxide, lithium manganese oxide, or other lithium-based electrochemically active battery material. A solid-state electrolyte can be utilized, such as lanthanum lithium titanium oxide ($Li_{3x}La_{2/3-x}TiO_3$ (x=0.11)), lanthanum lithium zirconium oxide (Garnet ($Li_7La_3Zr_2O_{12}$)), Sulphide ($Li_{10}GeP_2S_{12}$), Ohara Corp (LiSICON), or similar solid-state electrolyte with high lithium ion conductivity, and an additive such as carbon black carbon nanotubes or other suitable material to provide electrical conductivity all bonded together by an inorganic electrolyte such as Lithium Phosphorous Oxynitride (LiPON).

The active material selected for inclusion in a given electrode can be chosen for a desired operating voltage and capacity, and whether its intended function is as a cathode or anode in the final cell. In embodiments, a separator can include powder material of a solid-state electrolyte, such as lanthanum lithium zirconium oxide or similar solid-state electrolyte with high lithium ion conductivity bonded together by an electrolyte formed in situ such as Lithium Phosphorous Oxynitride (LiPON) produced by melt and reaction at low temperature reaction.

The powder constituents of an electrode or separator are first thoroughly mixed. The mixture can be hot pressed as a pellet or it can be spun, spray, doctor blade casted or printed onto a substrate to produce cathode, electrolyte separator, and anode component layers of a cell that are 3um to 1mm thick. The formed cell components are subsequently hot pressed or rolled at an elevated temperature sufficient to soften or melt the low melt temperature electrolyte constituent of the electrode. Upon cooling and re-hardening, the low melt constituent binds the electrode together and provides ionic conductive continuity between the component powder particles. The high ion conductive powder electrolyte component dispersed within the electrode provides low impedance for conduction of lithium ions throughout the structure of the electrode to enable a resulting cell that has high charge and discharge rate capability. The electrically conductive component dispersed in the cathode provides low impedance for transport of electrons throughout the cathode construction to allow for high rate capability.

The electrode can be constructed (to include manufactured, fabricated, etc.) to stand alone as in a pressed pellet, or can be fabricated as a thin coating applied to a substrate. If the standalone construction is used, a current collector (aluminum, nickel, copper, or similar metal) can be sputtered or evaporated onto the electrode as a coating to act as a current collector and to provide electrical contact. The current collector could also be bonded as a foil onto one surface of the electrode during the high temperature pressing process. Alternatively, if the electrode is coated onto a non-electrically conductive substrate, then the substrate will be coated first with a suitable current collector to provide electrical contact to the cathode. The substrate material can be a metal foil, ceramic, polymer, and/or any other suitable material.

A composite battery electrode is formed using low melt temperature electrolyte as a binder to achieve low interface impedance bonding between the constituents. A surface of the composite electrode formed in this manner can be coated with a thin layer of the same low melt temperature electrolyte used inside the composite cathode to function as an electrolyte separator between the cathode and anode. The coating may include a filler powder of the high ionic conductive material thus forming a composite separator. A thin coating of lithium metal is evaporated onto the electrolyte separator coating to form an anode and thereby complete the battery.

In an alternate design to make a Li-ion cell, a first electrode is formed as an anode containing a Li ion intercalation compound having a low lithium reaction potential. A second electrode is formed as a cathode containing a Li ion intercalation material that has a higher reaction potential than the material used in the first electrode. The anode and cathode thus formed are bonded to each other using a low melt temperature electrolyte separator layer to form an all-solid-state battery having a solid-state glass electrolyte bonded cathode and solid-state glass electrolyte bonded anode.

Metal oxide electrolytes having conductivities in the range of $10^{-3}$ S/cm have been fabricated. Yet, use of such materials as solid electrolytes in all-solid-state batteries has been limited. One problem is the high interface impedance that results from the high temperature sintering process used to form the bonds between the electrolyte and active cathode materials. Bonding is needed to enable lithium ion conduction between the materials; however, inter-atomic migration during sintering results in very high interface impedance and very limited functionality of a resulting cell.

On the other hand, Lithium Phosphorous OxyNitride (LiPON) is a solid electrolyte that has relatively low ionic conductivity, in the range of $10^{-6}$ S/cm. This material is typically produced as a thin film coating by reactive sputter deposition. However, similar ion conductive material can be fabricated in bulk by solid-state reaction, although material produced to date has not been the exact composition and have shown lower ionic conductivity. LiPON is a glass electrolyte that softens at temperatures in the range of 300° C. Reactive sputtered compositions have been fabricated that display conductivity as high as $9.4 \times 10^{-6}$ S/cm. In constructing thin film batteries, LiPON is sputter deposited as a thin, 1um to 2um coating on top of a cathode layer followed by a evaporated coating of anode material, typically lithium. Even though the actual conductivity of LiPON is only in the 1 $e^{-6}$ S/cm range, its use in thin film form allows relatively low levels of cell resistance to be achieved. The "high" conductivity form of LiPON generally has the formulation $Li_3PN_{0.14}O_4$. However as a glass, a range of mixture ratios of the constituent elements is possible and its conductivity varies with composition. It has long been a desire to develop a method for producing LiPON in bulk that has ionic conductivity that is comparable to that produced by reactive sputter deposition. Another example of low melt temperature, ion conductive material is the amorphous mixture of $LiNO_3$ and nano-$Al_2O_3$. The ionic conductivity of $LiNO_3$ and $Al_2O_3$ mixture is in the range of $10^{-6}$ S/cm, similar to LiPON. $LiNO_3$ and $LiNO_2$ are lithium nitrates salts having melt temperatures of 255° C. and 220° C. respectively. $LiH_2PO_4$ and $P_2O_5$ are solid acids having melt temperatures of 189° C. and 340° C. respectively. Generally a balanced reaction between one of these salts and one of the acids produces lithium phosphate ($LiPO_3$ and/or $Li_3PO_4$) as reaction products. However, including a small percentage of excess salt as a reactant results in a reaction product mixture that includes nitrogen salt dispersed in the lithium phosphate reaction product. An unanticipated result is that the dispersed lithium nitride salt results in formation of a LiPON mixture that displays ionic conductivity at a level similar to that of LiPON produced by reactive sputter deposition. The resulting reaction product is not meltable at low temperature. Alternatively, other electrolytes that exhibit usable conductivity and melt temperature characteristics include $Li_2O$—$MoO_3$, $Li_2O$—$WO_3$, $LiBr$—$Li_2O$—$WO_3$, and $LiBr$—$Li_2O$—$B_2O_3$—$P_2O_5$.

Although these example low melt temperature electrolytes have low ionic conductivities, their low melt temperature makes them suitable for effectively bonding with and forming low ionic impedance interfaces with lithium active battery materials and with other, faster lithium ion conductive materials. They can be heated to a molten or near molten state and interfaced with lithium active materials without the inter-atomic migration problems typically associated with high temperature sintering, a problem which until now has limited the practical construction of high performance all-solid-state batteries. The low conductivity, low melt temperature electrolyte is, in effect, employed in thin film form in order to achieve high conductivity rates, similar to the way low conductivity electrolyte is used in thin film batteries.

The low melt temperature, low conductivity electrolyte can be used to form thin film links or interfaces between the constituent powder components of the electrode. A lithium active powder such as Lithium Nickel Manganese Cobalt Oxide, an electrically conductive powder such as carbon black or powder like carbon nano-tubes, and a fast ionic conductive solid electrolyte powder such as Lithium Lanthanum Zirconium Oxide (LLZO) having ionic conductivity in the $10^{-3}$ S/cm range can all be combined with a salt and acid mixture of $LiNO_2$ or $LiNO3$ and $LiH_2PO4$ or $P_2O_5$. Heating the mixture under pressure at relatively low temperature causes the salt to melt and react with the acid to produce a lithium ion conductive glass matrix that bonds the structure together. The fast LLZO component provides high conductivity rates across the entire depth of the cathode once the constituent powders are all linked to each other via the low interface impedances enabled by the in situ formed electrolyte component.

To construct an electrode (cathode or anode), the powder components, including the low melt temperature electrolyte in powder form are all mixed together and then hot pressed into a pellet or casting. The combination of heat and pressure causes the low melt temperature electrolyte to soften and flow into the voids between the other component powder particles. The low melt temperature electrolyte bonds the other component particles together and provides ionic conductivity between them. The fast ion conductive electrolyte component functions as the primary lithium ion conductive material for conducting ions across the thickness of the electrode. The low melt temperature electrolyte primarily forms thin interface layers between the component particles to minimize the overall ionic impedance of the electrode. The different functional roles of the two electrolytes enable the construction (to include manufacture, fabrication, etc.) of relatively thick, low impedance electrodes.

In an alternate embodiment, the low temperature electrolyte is used to form a protective coating on the individual lithium active powder particles. The approach is to mill the lithium active, electrically conductive carbon nanotubes and the low melt temperature electrolyte powders together as a dry mixture in a mill having sufficient energy such that the particle to particle friction generates sufficient heat to melt the low melt temperature electrolyte component. The individual lithium active particles become individually coated with a film of ion conductive glass which also conducts electrons because of the carbon embedded therein. The coated particles can be subsequently mixed, at low energy so as not to disturb the coating, with Lithium Phosphorous Sulfide based super ionic conductive electrolyte material, such as $Li_{10}GeP_2S_{12}$ which, without the glass electrolyte coating, could form an unstable interface with the lithium active material. Yet another embodiment is to apply a thin electrolyte separator coating of the low melt temperature electrolyte, or a mixture of the low melt temperature electrolyte, and a fast lithium ion conductive electrolyte onto the surface of a lithium active electrode (anode or cathode). The coating may be applied by hot pressing or hot roll coating/ extrusion.

FIG. 1 illustrates an example 100 of constructing an all-solid-state lithium battery cell representative of slurry coated construction with a lithium metal anode in one or more embodiments of solid state batteries. Cathode current collector foil 102 is used as a substrate and as a cathode current collector for the battery. The foil passes over roller 104 and onto casting table 106. Slurry 108 is premixed by milling and is supplied to the casting table. The slurry includes of a carrier liquid with an active cathode powder, a low melt temperature electrolyte powder, a fast ion conductive electrolyte powder, and an electrically conductive powder. A liquid such as acetonitrile is selected as the liquid component of the slurry based on its chemical stability with the constituent powders in the slurry and it having sufficient vapor pressure for easy removal by evaporation. The slurry 108 is coated onto the foil substrate 102 as the substrate passes across the casting table 106. Doctor blade 110 is used to control the thickness of the resulting coating.

The coated foil 112 passes through dryer oven 114 where the carrier liquid is removed by evaporation and the casting is preheated prior to passing on to hot rollers 116. The coated foil 112 passes through hot rollers 116. The temperature of rollers 116 would typically be less than about 500° C. The temperature of rollers 116 is sufficient to melt or soften the low melt temperature electrolyte causing it to flow under the pressure of the rollers into the pores and gaps between the constituent powder particles as the particles are pressed closer to each other under the force applied by the rollers.

Next, an electrolyte separator slurry 118 is coated on top of the cathode casting 120, where the electrolyte separator slurry 118 is electrolyte powder and a liquid carrier, such as acetonitrile. Slurry 118 may optionally contain fast conductive electrolyte powder as well as the low melt temperature component. Doctor blade 124 is used to control the thickness of the casting. The now multilayer casting 122 passes through dryer oven 126 where the carrier liquid is removed from the coating. Hot rollers 128 apply heat and pressure to melt or soften the electrolyte powder coated on the surface of the cathode, as well as melt, at least to some extent, the low melt temperature electrolyte within the cathode yielding monolithic glass electrolyte bonded and coated cathode casting 132 on the current collector foil. Finally, anode foil 130 is hot pressed and bonded to the surface of the glass electrolyte coating by hot rollers 134 to form the completed cell casting 136. Foil 130 may be lithium foil, copper foil, lithium coated copper foil, or other suitable anode or anode current collector material. Alternatively, the anode may be applied by evaporation under vacuum. If lithium is not employed, then the lithium anode will be first formed upon the initial charge of the cell as lithium is plated beneath the anode current collector. Solid-state battery cell 140 is representative of the structure of an all-solid-state lithium battery cell with a cathode current collector/substrate 148, composite cathode 146, glass electrolyte coating 144, and anode/anode current collector 142.

Figure 2:
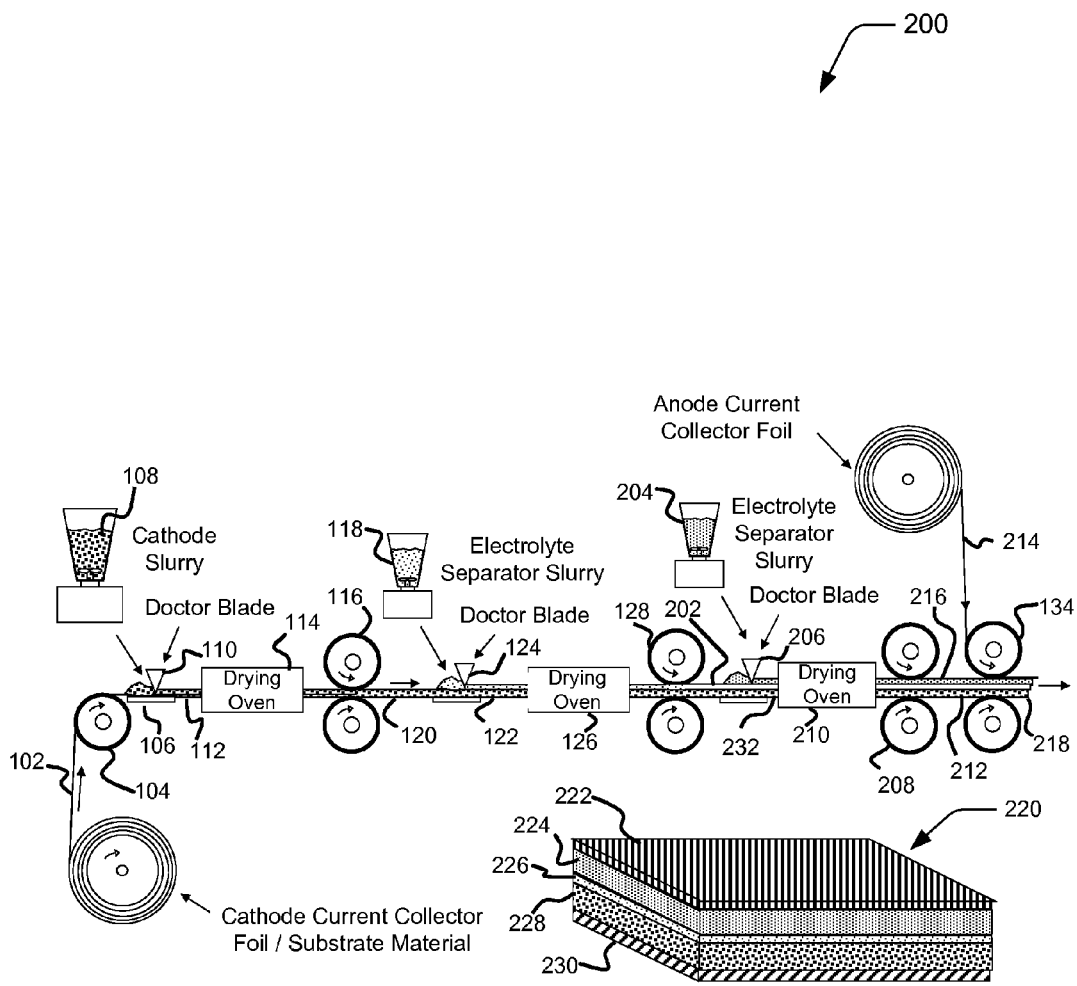
FIG. 2 illustrates an example construction of an all-solid-state lithium ion battery cell with an active anode in one or more embodiments of a solid-state battery.

FIG. 2 illustrates an example 200 of constructing of an all-solid-state lithium ion battery cell representative of slurry coated construction with an anode current collector foil in one or more embodiments of solid state batteries. An active anode is employed instead of a lithium metal anode. Similar to the construction of the lithium metal anode cell, cathode current collector foil 102 is used as a substrate and as a cathode current collector for the battery. The foil 102 passes over roller 104 and onto casting table 106. Active cathode powder, a low melt temperature electrolyte powder, a fast ion conductive electrolyte powder, an electrically conductive powder, and carrier liquid slurry 108 is coated onto the substrate using doctor blade 110. The slurry is dried by oven 114 and calendared using hot rollers 116 to bond the structure together.

Next, a slurry of electrolyte separator powder 118 is coated on top of the cathode casting 120 using doctor blade 124, where the electrolyte separator powder 118 is electrolyte reactant powder and a carrier liquid, such as acetonitrile. Slurry 118 may optionally contain a fast conductive electrolyte powder as well as the low melt temperature component. The resulting casting 122 is dried in oven 126. Hot rollers 128 apply heat and pressure to reflow the low melt temperature electrolyte material in the cathode and separator to bond the structure together. Next, slurry of active anode material 204 is coated on top of thus formed separator coating 202 using doctor blade 206. The multilayer casting 232 passes through oven 210 for drying and optional preheating, and subsequently through hot rollers 208 for electrolyte reflow and calendaring to bond the structure together. Finally, anode current collector foil 214 is hot pressed and bonded to the surface of the thus formed active anode layer 216 of cell casting 212 by hot rollers 134 to form the completed cell casting 218. Alternatively, the anode current collector may be applied by evaporation. A suitable active material for the cathode layer is lithium nickel cobalt manganese oxide (LiNiCoMnO2) and a suitable anode active material is lithium titanium oxide (LTO). This combination would result in a cell having a mean voltage of approximately 2.0V. Solid-state battery cell 220 is representative of the structure of an all-solid-state lithium ion battery cell with a cathode current collector/substrate 230, composite cathode 228, glass electrolyte coating 226, composite anode 224 and anode/anode current collector 222.

Figure 3:
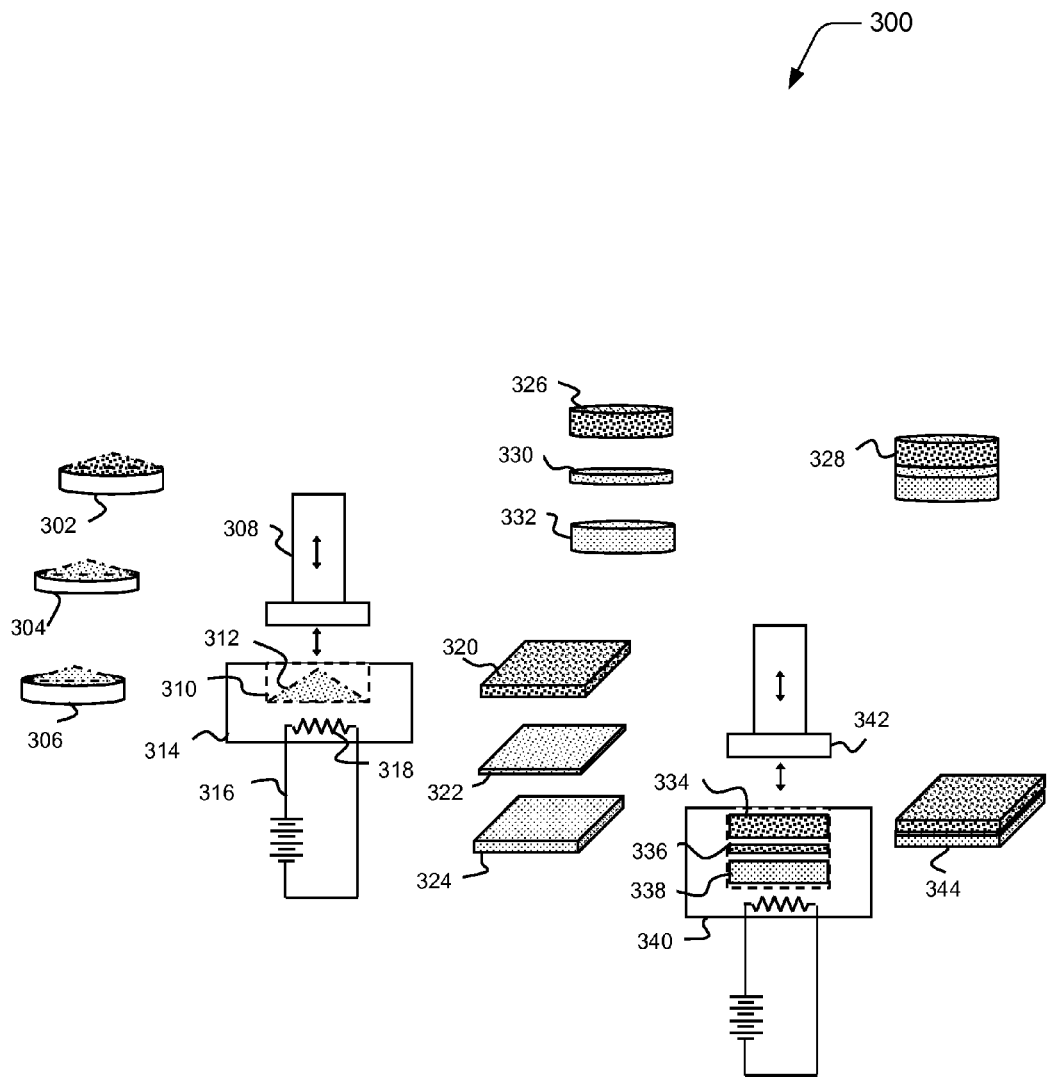
FIG. 3 illustrates an example construction of an all-solid-state lithium ion battery cell having an electrode formed by powder materials hot pressed into free standing pellets or wafers in one or more embodiments of a solid-state battery.

FIG. 3 illustrates an example 300 of constructing an all-solid-state lithium ion battery cell representative of hot pressed electrode powder construction in one or more embodiments of solid state batteries. The basic structure of the cell is similar to that of the cells depicted in FIGS. 1 and 2. However, in an embodiment, the electrode powder materials are hot pressed into free standing pellets or wafers as opposed to using a liquid carrier to make a slurry for casting onto a substrate. Cathode and anode pellets can be used to form batteries that have an integrated circuit chip or pellet like configuration. As in the case of the casted electrodes, the low melt temperature electrolyte performs the dual function of providing low interface impedance particle to particle ionic conduction and of bonding the constituent powders together. A measured amount of electrode or separator powder mixture is placed in a die and hot pressed at a temperature, approximately 300° C., which is sufficient to reflow the low temperature electrolyte component of the powder and bond the constituent powders together. The shape of the die and the amount of powder placed in the die determines the physical dimensions of the resulting pellet or wafer.

In FIG. 3, measured amounts of cathode powder mixture 302, separator powder 304, and active anode powder 306 are each individually placed at 312 inside cavity 310 of heated die 314, the die being heated by heating element 318 from power supply 316, and hot pressed by piston 308 to form the respective component layers of a battery cell. Dies can be configured to produce prismatic shaped cathode 324, prismatic shaped electrolyte separator 322, and prismatic shaped active anode 320. Similarly, dies could be configured to form disc shaped cell components as represented by cathode 326, separator 330, and anode 332 or even other configurations. The thickness of the component layers depends on the amount of powder used. The individual components 334, 336, and 338 may be placed together in a heated die such as illustrated by 340 and hot pressed by piston 342, where the components are fused together to form a complete cell structure. The cavity shape of die 340 is selected to make the desired shape of the cell component to form a prismatic shaped cell 344, a disc shaped cell 328 or other shapes. Anode and cathode current collectors may be vacuum evaporated or hot pressed as foils onto the anode and cathode surfaces of the cells.

Figure 4:
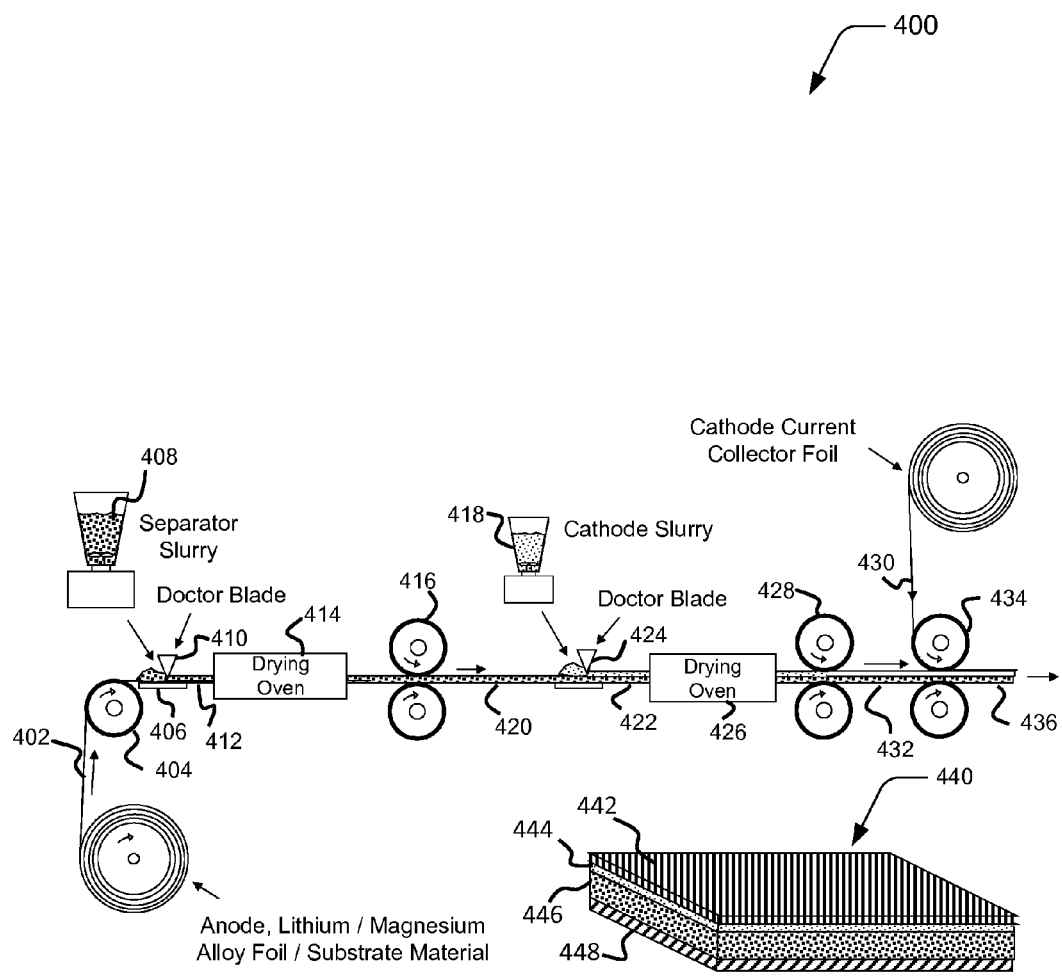
FIG. 4 illustrates an example construction of an all-solid-state lithium ion battery cell with a lithium magnesium alloy in one or more embodiments of a solid-state battery.

FIG. 4 illustrates an example 400 of an all-solid-state lithium ion battery cell in one or more embodiments of solid state batteries. A lithium magnesium alloy can be employed as a substrate and anode. The lithium magnesium alloy foil 402 passes over roller 404 and onto casting table 406. A doctor blade 410 is used to cast electrolyte separator material 408 onto lithium magnesium foil 402. The coated foil 412 passes through dryer oven 414 where the carrier liquid is removed by evaporation and the casting is preheated prior to passing on to hot rollers 416. After drying and hot rolling to reflow the meltable portion of the electrolyte and form a continuous coating, doctor blade 424 is used to apply cathode coating material 418 on top of the electrolyte separator layer of anode-separator casting 420. The anode, separator, cathode stack 422 is dried in drying oven 426 and hot rolled with hot rollers 428. Then the cell structure is completed by applying a current collector foil layer 430 to the completed anode, separator, cathode stack 432 with hot rollers 434 to bond together the completed cell casting 436. Note that an anode having a solid electrolyte coating applied thereto could be useful in other types of batteries, including those that employ an organic electrolyte such as a liquid or polymer. Solid-state battery cell 440 is representative of the structure of an all-solid-state lithium battery cell with a lithium magnesium alloy anode/substrate 448, composite cathode 446, glass electrolyte coating 444, and a cathode current collector 442. The foil 402 may be a non-active material such as copper foil. In such an embodiment, the lithium anode is formed during the first charge cycle.

Figure 5:
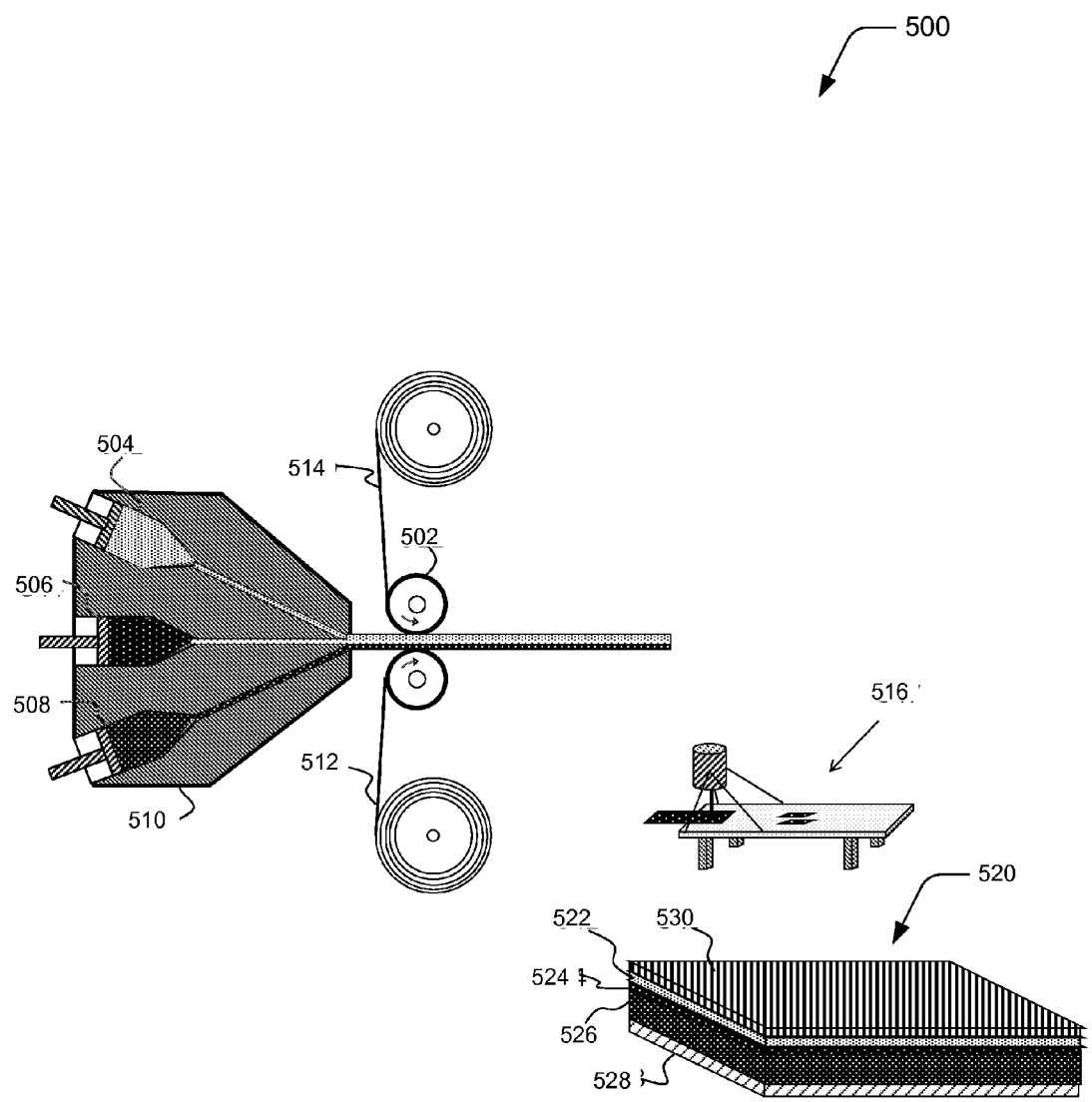
FIG. 5 illustrates an example construction of an all-solid-state lithium ion battery cell with coextruded cathode, separator, and anode material in one or more embodiments of a solid-state battery.

FIG. 5 illustrates an example 500 of an all-solid-state lithium ion battery cell in one or more embodiments of solid state batteries. The example 500 illustrates co-extrusion of the cathode material 508, separator material 506, and anode material 504 using extrusion die 510. The extruded material is supplied to hot rollers 502 where cathode current collector 512 and anode current collector 514 are laminated onto the resulting battery structure. The continuous web of battery structure is subsequently cut into individual battery cells as illustrated by laser cutting table 516. Solid-state battery cell 520 is representative of the structure of an all-solid-state lithium ion battery cell with a cathode current collector/substrate 528, composite cathode 526, separator material 524, composite anode 522, and anode current collector 530.

Figure 6:
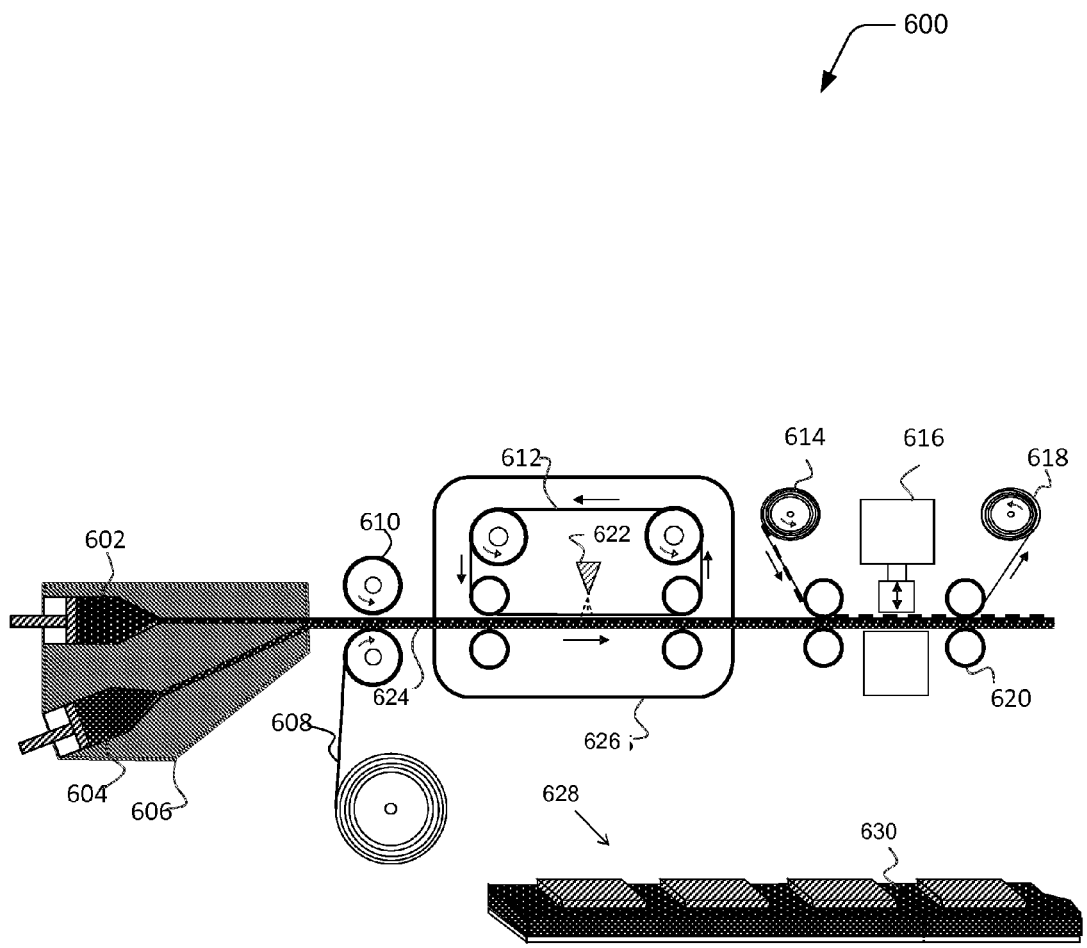
FIG. 6 illustrates an example construction of an all-solid-state lithium ion battery cell with coextruded cathode and separator material in one or more embodiments of a solid-state battery.

FIG. 6 illustrates an example 600 of an all-solid-state lithium ion battery cell in one or more embodiments of solid state batteries. The example 600 illustrates the use of die 606 to co-extrude cathode material 604 and separator material 602. Cathode current collector 608 is laminated onto the cathode side of the cathode separator structure by hot rollers 610. Anode deposition chamber 626 applies an anode coating to the surface of the separator of the cathode-separator stack 624 by evaporation using evaporator 622. Continuous mask 612 is configured having a series of open window areas that determine the deposition pattern of the evaporated lithium. It moves above the surface of the extruded cathode/separator at the same speed so as to define specific areas of the separator surface on which the anode material will deposit. Battery structure 628 illustrates an example of a series of anodes applied along the separator surface. Such a patterned deposition simplifies cutting the continuous web into individual cells. For example, the cells can be cut between individual cells as illustrated by dotted line 630 without concern about short circuiting the anode to the cathode along the cut line.

Hot press 616 is utilized for thermal lamination of precut anode current collectors onto the surface of the separator. The anode current collectors are conveyed from a supply reel 614 through hot press 616, where they are laminated to the separator, with the leftover carrier tape for the precut anode current collectors captured by take-up spool 618. The evaporation and thermal lamination may be performed in series, where the evaporated lithium functions as a wetting layer to enhance the bonding of the subsequent thermally bonded anode current collector structure. The thermally bonded anode structure may be lithium, copper, or other suitable material. Evaporation chamber 626 may alternatively apply copper as an anode structure as opposed to a lithium layer. The copper would function as a current collector whereby lithium would evolve as an anode as it is plated from the cathode on first charge.

Figure 7:
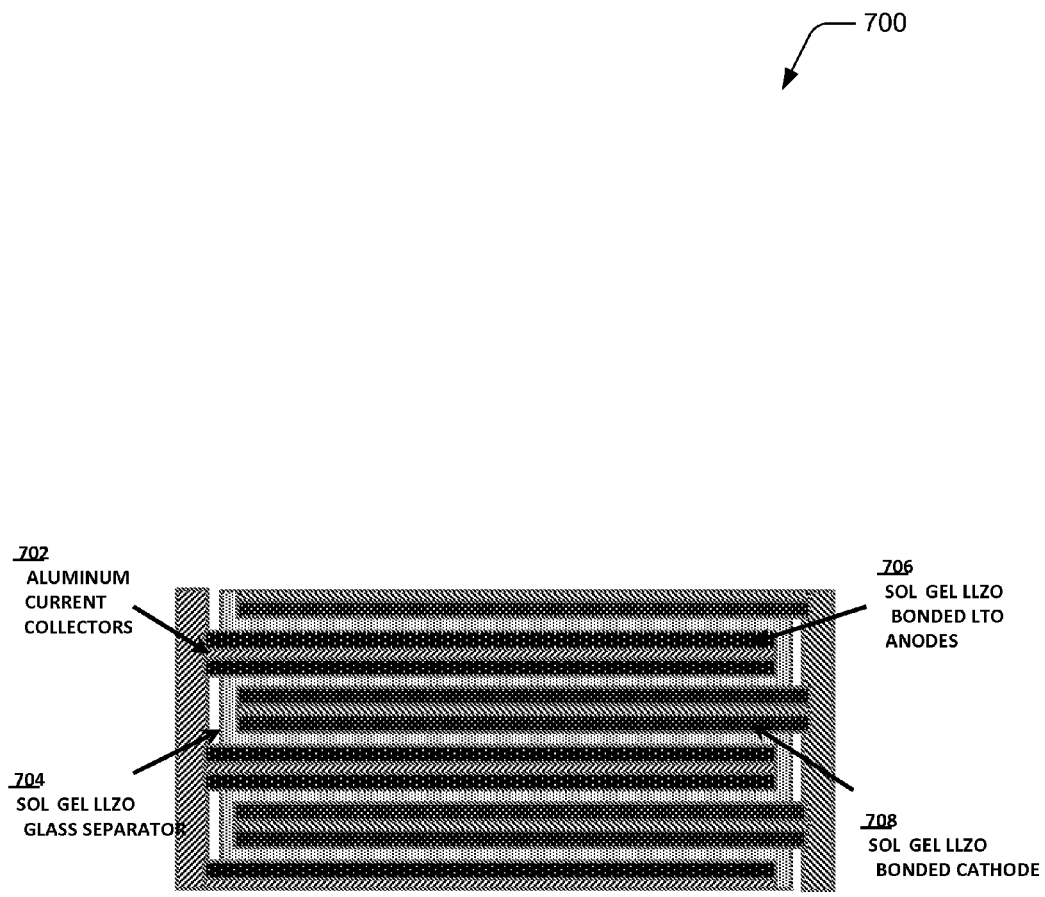
FIG. 7 illustrates an example construction of an all-solid-state lithium ion battery with multiple cells in one or more embodiments of a solid-state battery.

FIG. 7 illustrates an example 700 of an all-solid-state lithium ion battery constructed with multiple cells, which are constructed with aluminum current collectors 702, sol gel LLZO glass separators 704, sol gel LLZO bonded LTO anodes 706, and sol gel LLZO bonded cathodes 708. The example all-solid-state battery can be constructed using a series of alternating layers of cathode, cathode current collector, cathode, separator, anode, anode current collector, anode, separator, cathode and so on.

CONCLUSION

Implementations of electrodes for rechargeable solid-state batteries are described. In at least some embodiments, electrodes are fabricated from electrochemically active powder material and meltable inorganic solid electrolyte. The meltable inorganic solid electrolyte is configured to bond together the electrochemically active powder material to form the electrode.

Implementations of electrodes for rechargeable solid-state batteries are described. In at least some embodiments, electrodes are fabricated from electrochemically active powder material and meltable inorganic solid electrolyte. The meltable inorganic solid electrolyte is configured to bond together the electrochemically active powder material to form the electrode.

Implementations of rechargeable solid-state batteries are described. In at least some embodiments, batteries are fabricated from a metal foil anode substrate and a separator, which is roll cast on the metal foil anode substrate to form an anode-separator casting.

Implementations of anodes for rechargeable solid-state batteries are described. In at least some embodiments, anodes are fabricated from lithium active powder material and meltable inorganic solid electrolyte. The meltable inorganic solid electrolyte is configured to form a protective coating on individual particles of the lithium active powder material.

Although the embodiments have been described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

The invention claimed is:

1. A rechargeable solid-state battery electrode comprising:
an electrochemically active powder material;
a low ionic conductivity, low melting temperature inorganic solid electrolyte; and
a high ionic conductivity, high melting temperature solid electrolyte, wherein the low melting temperature inorganic electrolyte binds the active material and the high melting temperature electrolyte together,
and wherein the low ionic conductivity inorganic electrolyte is selected from the group consisting of $Li_2O$—$MoO_3$, $Li_2O$—$WO_3$, $LiBr$—$Li_2O$—$WO_3$, $LiBr$—$Li_2O$—$B_2O_3$—$P_2O_5$, a mixture of $LiNO_3$ and $Al_2O_3$, and a mixture of $LiNO_2$ or $LiNO_3$ and $LiH_2PO_4$ or $P_2O_5$.

2. The electrode according to claim 1, further comprising an electrically conductive material; wherein the low melting temperature inorganic electrolyte binds the active material, the high melting temperature electrolyte, and the electrically conductive material together.

3. The electrode according to claim 1, wherein the high ionic conductivity electrolyte is a lithium ion conductive electrolyte powder.

4. The electrode according to claim 1, wherein the electrochemically active powder material is lithium-based.

5. The electrode according to claim 1, wherein the low melting temperature inorganic solid electrolyte has a melting temperature of not higher than 500° C.

6. The electrode according to claim 1, wherein the electrode is formed by roll casting a slurry containing the electrochemically active powder material, the low melting temperature inorganic electrolyte, and the high melting temperature electrolyte.

7. The electrode according to claim 1, wherein the electrode is formed by hot pressing the electrochemically active powder material, the low melting temperature inorganic electrolyte, and the high melting temperature electrolyte.

8. A solid-state battery comprising the electrode according to claim 1.

9. The solid-state battery according to claim 8, wherein the electrode further comprises electrically conductive material; and wherein the low melting temperature inorganic electrolyte binds the active material, the high melting temperature electrolyte, and the electrically conductive material together.

10. A solid state battery anode, wherein the anode comprises:
a lithium active powder material;
a low ionic conductivity, low melting temperature inorganic solid electrolyte; and
a high ionic conductivity, high melting temperature solid electrolyte, wherein the low melting temperature inorganic electrolyte forms a protective coating on individual particles of the lithium active powder material, and wherein the low ionic conductivity inorganic electrolyte is selected from the group consisting of $Li_2O$—$MoO_3$, $Li_2O$—$WO_3$, $LiBr$—$Li_2O$—$WO_3$, $LiBr$—

$Li_2O$—$B_2O_3$—$P_2O_5$, a mixture of $LiNO_3$ and $Al_2O_3$, and a mixture of $LiNO_2$ or $LiNO_3$ and $LiH_2PO_4$ or $P_2O_5$.

11. The anode according to claim 10, wherein the anode is formed by roll casting comprising:
providing an anode slurry containing the electrochemically active powder material, the low melting temperature inorganic electrolyte, and the high melting temperature electrolyte;
applying the anode slurry to a cathode separator casting;
controlling a thickness of the applied anode slurry with a doctor blade;
drying the anode slurry in a drying oven; and
bonding the dried anode slurry to the cathode separator casting with hot press rollers.

12. The anode according to claim 10, wherein the low melting temperature inorganic solid electrolyte has a melting temperature of not higher than 500° C.

13. The anode according to claim 10, wherein the anode is formed by co-extrusion of an anode material with a cathode material and a separator material.

14. The electrode according to claim 1, wherein the low melting temperature inorganic electrolyte forms a matrix containing the active material and the high melting temperature electrolyte.

15. The electrode according to claim 1, wherein the electrode is formed by heating to a temperature of not higher than 500° C. under pressure.

16. A rechargeable solid state battery electrode, wherein the electrode comprises a matrix containing an electrochemically active powder material; a low ionic conductivity, low melting temperature inorganic solid electrolyte; and a high ionic conductivity, high melting temperature solid electrolyte, wherein the low ionic conductivity inorganic electrolyte is selected from the group consisting of $Li_2O$—$MoO_3$, $Li_2O$—$WO_3$, $LiBr$—$Li_2O$—$WO_3$, $LiBr$—$Li_2O$—$B_2O_3$—$P_2O_5$, a mixture of $LiNO_3$ and $Al_2O_3$, and a mixture of $LiNO_2$ or $LiNO_3$ and $LiH_2PO_4$ or $P_2O_5$.

17. The electrode according to claim 16, wherein the matrix further comprises an electrically conductive material.

* * * * *